(12) United States Patent
Nakanishi

(10) Patent No.: US 6,928,069 B2
(45) Date of Patent: Aug. 9, 2005

(54) BANDWIDTH MANAGEMENT APPARATUS, ADDRESS RESOLUTION ASSISTANCE APPARATUS, METHOD FOR MANAGING BANDWIDTH, AND METHOD FOR ASSISTING ADDRESS RESOLUTION

(75) Inventor: Akira Nakanishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 906 days.

(21) Appl. No.: 09/928,800

(22) Filed: Aug. 13, 2001

(65) Prior Publication Data

US 2002/0136239 A1 Sep. 26, 2002

(30) Foreign Application Priority Data

Mar. 22, 2001 (JP) ........................................ 2001-083233

(51) Int. Cl.7 .......................... H04L 12/26; H04L 12/66
(52) U.S. Cl. .................. 370/352; 370/235; 370/395.21; 379/265.06
(58) Field of Search .................................. 370/235, 329, 370/352–356, 395.21, 395.43; 379/365.02, 265.06, 266.03

(56) References Cited

U.S. PATENT DOCUMENTS 5,940,497 A * 8/1999 Miloslavsky ........... 379/265.11
6,122,364 A * 9/2000 Petrunka et al. ....... 379/265.02

FOREIGN PATENT DOCUMENTS

| JP | 10-294788 | * 11/1998 |
| JP | 2000-196664 |   7/2000 |

* cited by examiner

Primary Examiner—Afsar Qureshi
(74) Attorney, Agent, or Firm—Katten Muchin Zavis Rosenman

(57) ABSTRACT

A bandwidth management apparatus determines, when a call whose communication information is to be transmitted as a sequence of datagrams is assigned, a link to be used for transmitting the communication information, judges whether there exists a surplus bandwidth in sections of the determined link, and allocates the call to a bandwidth necessary for transmitting the communication information when the judgement result is true, and informs a node that is involved in call setup for the call about the judgement result. Also disclosed are an address resolution assistance apparatus that cooperates with the bandwidth management apparatus, a band managing method, and an address resolution assisting method which realize the respective apparatuses. In a network to which the invention is applied, good speech quality can be stably maintained irrespective of its configuration and scale.

18 Claims, 19 Drawing Sheets

FIG. 4

| ORIGINATING BASE IDENTIFIER | ROUTE INFORMATION | DESTINATION BASE IDENTIFIER |
|---|---|---|
| | 1-2 | |
| | 1-2, 2-3 | |
| ... | ... | ... |

41

F I G. 5

| ROUTE IDENTIFIER | UPPER LIMIT BANDWIDTH | MAXIMUM BANDWIDTH | CURRENT BANDWIDTH |
|---|---|---|---|
| $i$ | $BW_{ui}$ | $BW_{mi}$ | $BW_{ti}$ |
| ... | ... | ... | ... |

| CALL IDENTIFIER | ROUTE INFORMATION |
|---|---|
| | 1-2 |
| | 1-2, 2-3 |
| ... | ... |

43

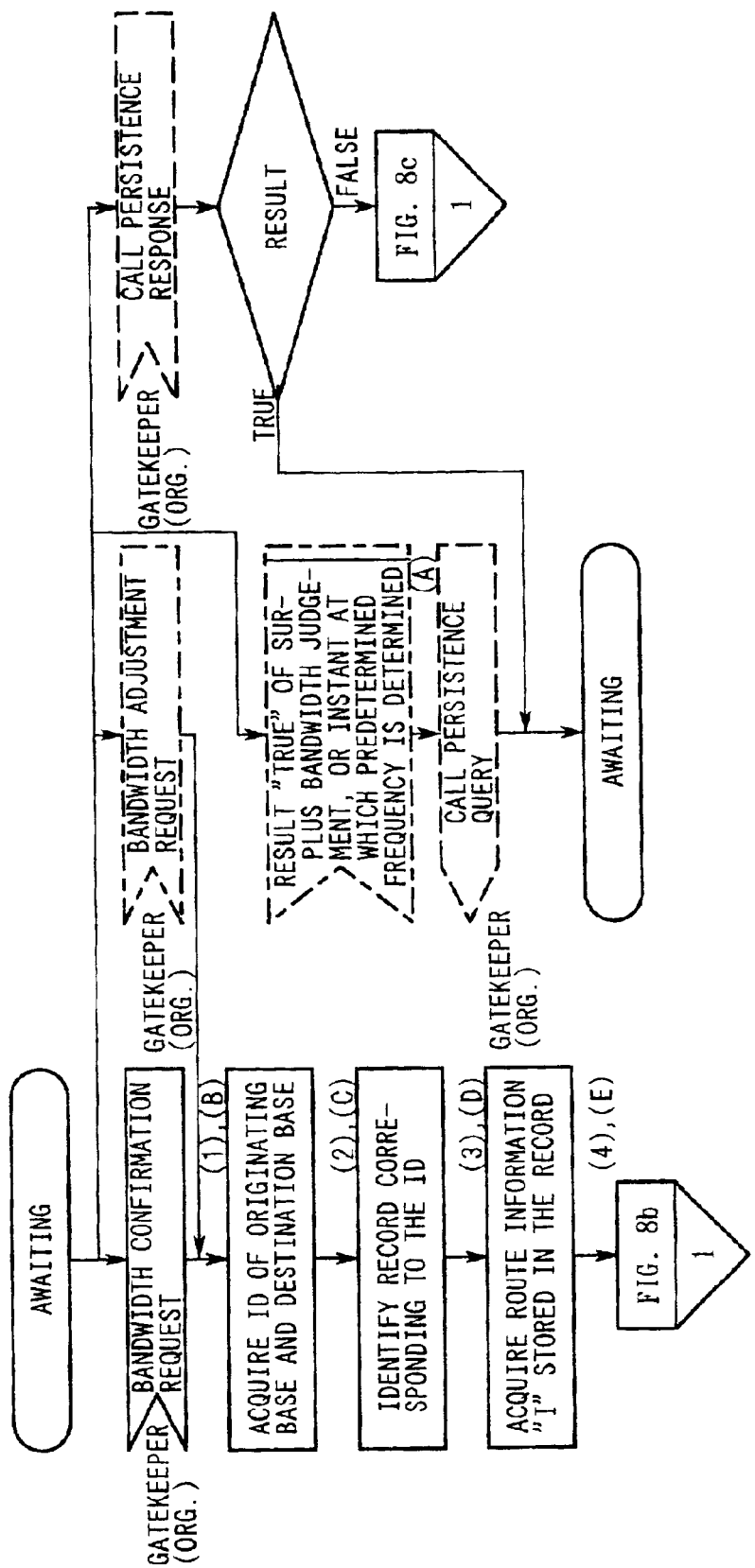

FIG. 10

TYPE, LENGTH, IDENTIFIER, AND VERSION NUMBER OF MESSAGE

| | HEADER | OBJECT | | | | |
|---|---|---|---|---|---|---|
| | | | ID1 | DATA1 | | |
| BANDWIDTH CONFIRMATION REQUEST (a) | | | ID1 | ORG. PRTY ORG. TERMINAL ID | ID2 DESTINATION CO-CALLER ID | ID3 BAND / DATA3 BANDWIDTH | ID4 CALL ID / CALL IDENTIFIER |
| BANDWIDTH CONFIRMATION NOTICE (b) | | | ID1 RESPONSE / OK / NG | | | |
| BANDWIDTH RELEASE REQUEST (c) | | | ID1 REASON / ITEM | | | |
| BANDWIDTH RELEASE NOTICE (d) | | | ID1 RESPONSE / OK / NG | | | |
| BANDWIDTH UPDATING DEMAND (e) | | | ID1 INTERFACE / INTERFACE IDENTIFIER | | | |
| CALL PERSISTENCE QUERY (f) | | | ID1 / - | ID2 FLOW / FLOW ID | ID3 BAND / DATA3 BANDWIDTH | |
| CALL PERSISTENCE RESPONSE (g) | | | ID1 RESPONSE / OK / NG | | | |
| BANDWIDTH ADJUSTMENT REQUEST (h) | | | ID1 ORG. PRTY ORG. TERMINAL ID | ID2 DESTINATION CO-CALLER ID | ID3 BAND / DATA3 BANDWIDTH | ID4 CALL ID / CALL IDENTIFIER |
| BANDWIDTH ADJUSTMENT RESPONSE (i) | | | ID1 RESPONSE / OK / NG | | | |

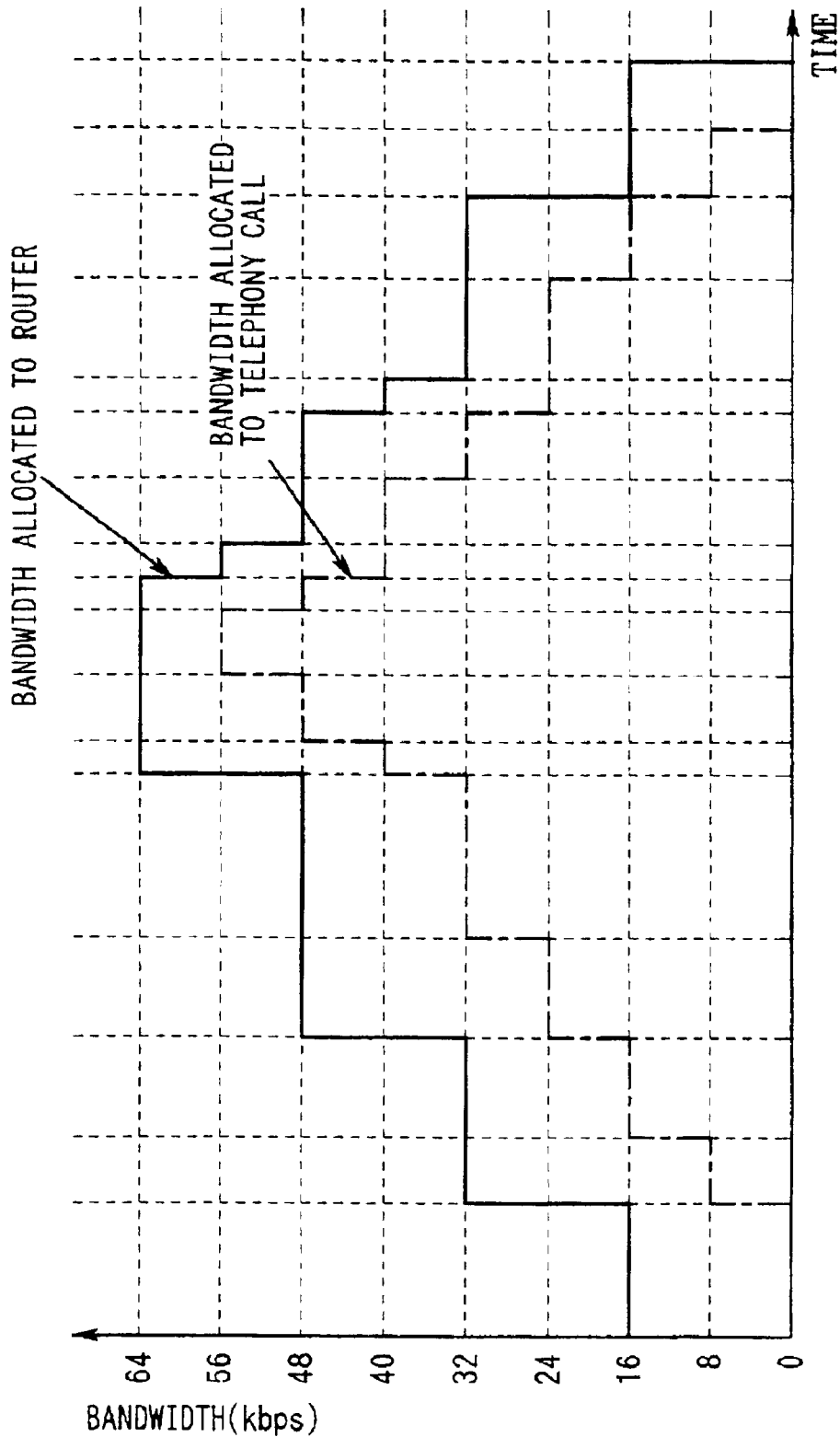

FIG. 15 PRIOR ART

| TELEPHONE NUMBER | IP ADDRESS |
|---|---|
| ... | ... |

| ORIGINATING TERMINAL IDENTIFIER | STATE INFORMATION | CO-CALLER IDENTIFIER |
|---|---|---|
| ... | ... | ... |

85-11

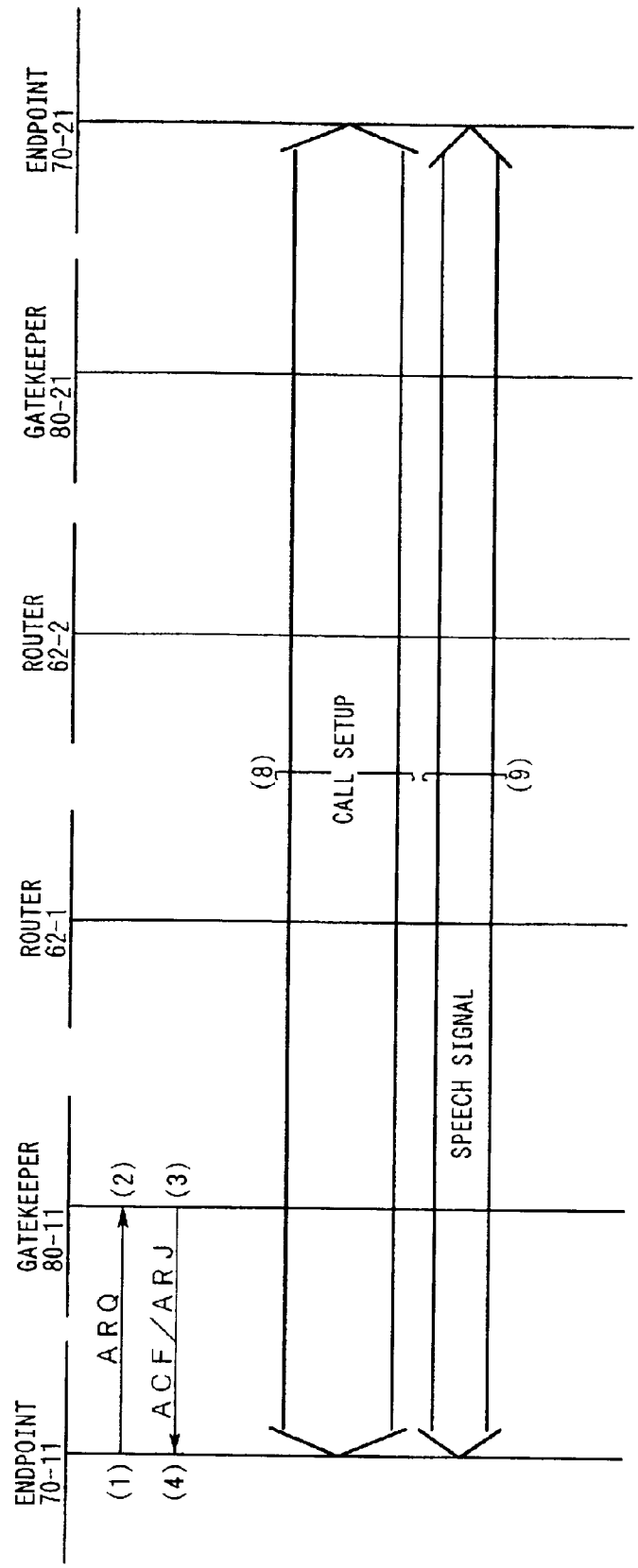

BANDWIDTH MANAGEMENT APPARATUS, ADDRESS RESOLUTION ASSISTANCE APPARATUS, METHOD FOR MANAGING BANDWIDTH, AND METHOD FOR ASSISTING ADDRESS RESOLUTION

BACKGROUND OF THE INVENTION

1. Field of the Invention

The present invention relates to a bandwidth management apparatus for allocating bandwidths to links to be used for transmission of communication information according to a call setup procedure and an address resolution assistance apparatus for performing mutual conversion between the telephone number and the address of the originating party of a call in a packet-switched network where communication information is transmitted as a sequence of datagrams. The invention also relates to a bandwidth managing method and an address resolution assisting method for realizing the above bandwidth management apparatus and the address resolution assisting apparatus, respectively.

2. Description of the Related Art

The Internet, which has advanced rapidly in recent years, is becoming a base of the management strategy of each of a number of companies as the cost of transmission of multimedia including images, speech, and video decreases and its speed increases. The information processing technology and the communication technology that implement the Internet are being studied and developed enthusiastically and becoming a base that is indispensable for the advancement of the network computing era.

In many corporate networks (including intranets and extranets) using the above technologies, a speech signal of a telephony call is transmitted as a sequence of datagrams such as IP packets under application of the VoIP.

FIG. 14 shows the configuration of an exemplary network to which the VoIP is applied.

In FIG. 14, LANs 61-11 and 61-12 (not shown for simplicity) are provided in respective bases 60-11 and 60-12 (bases here include sites) and respectively connected to first and second ports of a router 62-1. A third port of the router 62-1 is connected to a first port of a router 62-2 via an internode link 63-12 that is a link. LANs (will be denoted below by symbols "61-21" and "61-22" but are not shown in FIG. 14 for simplicity) that are provided in respective bases 60-21 and 60-22 are connected to second and third ports of the router 62-2. A fourth port of the router 62-2 is connected to a first port of a router 62-3 via an internode link 63-23. LANs (will be denoted below by symbols "61-31" and "61-32" but are not shown in FIG. 14 for simplicity) that are provided in respective bases 60-31 and 60-32 are connected to second and third ports of the router 62-3.

In the base 60-11, an endpoint 70-11 and a gatekeeper 80-11 are connected to the LAN 61-11.

The endpoint 70-11 is composed of the following components:

A terminal processing part 71-11 that is connected to the LAN 61-11.

A protocol converting part 72-11 that is connected in cascade to the terminal processing part 71-11.

An interfacing part 73-11 that is connected in cascade to the protocol converting part 72-11 and connected to a telephone network (not shown; may be an ISDN or a PBX) or a telephone set (not shown).

In the following description, the set of the terminal processing part 71-11, the protocol converting part 72-11, and the interfacing part 73-11 will be called "gateway" and will be given a symbol "70GW-11."

The gatekeeper 80-11 is composed of the following components:

An interfacing part 81-11 that is connected to the LAN 61-11.

A processor 82-11 having a bus or port that is connected to the interfacing part 81-11.

A database 83-11 that is accessed by the processor 82-11 when necessary.

The database 83-11 is composed of an address table 84-11 and a state management table 85-11 that will be described below.

As shown in FIG. 15, pairs of a telephone number (includes a unique office code that is given to a gateway that accommodates an accommodated terminal; or may be formed by only the office code) and an IP address that are given to each of the telephone sets that are connected to the interfacing part 73-11 or the telephone sets accommodated by a telephone network that is connected to the interfacing part 73-11 and terminals (hereinafter referred to simply as "accommodated terminals") that can be an originating party or a destination party of a telephony call among the terminals connected to the LAN 61-11 are stored in the address table 84-11 in advance.

The accommodated terminal is not limited to the telephone set and includes various kinds of communication terminals that can be used for multimedia transmission services, such as the facsimile terminal, image terminal, data terminal, and mobile terminal (including terminals conforming to IMT-2000 etc.). Further, the accommodated terminal is not limited to terminals that sends and receives a speech signal in an audio frequency band.

As shown in FIG. 16, the state management table 85-11 is a storage area where to store an array of records each being a combination of the following pieces of information:

An originating terminal identifier (may be either a telephone number or an IP address) indicating an accommodated terminal where a telephony originating call that has occurred is persisting among he abovementioned accommodated terminals.

A co-caller identifier (may be either a telephone number or an IP address) indicating an accommodated terminal (may be one that is accommodated by a base other than the base that accommodates the originating terminal) that is the co-caller of the accommodated terminal indicated by the originating terminal identifier.

State information indicating the states of the accommodated terminals indicated by the originating terminal identifier and the co-caller identifier, the type (e.g., an originating call or a termination call) of the call concerned, and an identifier indicating the call.

The hardware configurations of the bases 60-12, 60-21, 60-22, 60-31, and 60-32 are the same as the hardware configuration of the base 60-11, and hence will not be described. A notation will be employed in which components in the bases 60-12, 60-21, 60-22, 60-31, and 60-32 corresponding to a component in the base 60-11 are given the same reference numeral as the latter plus suffixes "12," "21," "22," "31," and "32" that replace the suffix "11."

In the conventional example having the above configuration, when, for example, an accommodated terminal that is accommodated by the base 60-11 originates a call to an accommodated terminal that is accommodated by the base 60-21 to cause a telephony call, the individual parts cooperate in the following manner.

In the base 60-11, the terminal processing part 71-11 sends, to the gatekeeper 80-11, via the LAN 61-11, a message ARQ that contains an originating terminal identifier indicating the accommodated terminal as the originating party and a co-caller identifier indicating the accommodated party as the destination party and that is an inquiry about permission/refusal of origination (indicated by symbol (1) in FIG. 17).

The gatekeeper 80-11 (processor 82-11) judges whether the state management table 85-11 does not have a record in which the value of the state information means that the call is persisting and that satisfies any of the following conditions (indicated by symbol (2) in FIG. 17):

The value of the originating terminal identifier field or the co-caller identifier field is equal to the value of the originating terminal identifier that is contained in the message ARQ.

The value of the originating terminal identifier field or the co-caller identifier field is equal to the value of the co-caller identifier that is contained in the message ARQ.

In the following description, the above judgement will be called "first judgement."

The gatekeeper 80-11 further performs the following series of operations:

Spirits the value of the co-caller identifier contained in the message ARQ according to a predetermined numbering plan (or rules relating to the allocation of IP addresses to the individual terminals accommodated by the bases 60-11 to 60-32), and acquires a base identifier indicating a base (hereinafter referred to as "counter base") where the terminal indicated by the co-caller identifier is accommodated.

Determines the number c of records in which the base indicated by the value of the co-caller identifier field is indicated by the above base identifier among the records of the state management table 85-11.

Judges whether the following inequality is satisfied for the number c of records and a maximum number N (it is assumed here that the maximum number N is given in advance as a known number) of speech signals that can be transmitted parallel as a sequence of IP datagrams via the internode link 63-11 formed between the base 60-11 and the base indicated by the base identifier. In the following description, the above judgement will be called "second judgement."

$$c \leq N-1$$

The gatekeeper 80-11 further sends the terminal processing part 71-11 a message ACF/ARJ indicating the AND of the results of the first and second judgements (indicated by symbol (3) in FIG. 17). Only when the AND value is true, the following operations are performed on one empty record of the state management table 85-11:

Seizes a record (hereinafter referred to as "reservation record") by appending predetermined control information to the state information field.

Stores the originating terminal identifier that is included in the message ARQ in the originating terminal identifier field.

Stores the co-caller identifier that is included in the message ARQ in the co-caller identifier field.

The terminal processing part 71-11 recognizes the message ACF/ARJ, that is, the above-mentioned AND value and suspends the call setup for the call concerned if the AND value is false.

However, when the AND value is true, the terminal processing part 71-11 acquires the IP address of the gatekeeper 80-21 in the base 60-21 where the terminal to become the destination party by referring to the value of the IP address field (hereinafter referred to as "destination party IP address") of the record corresponding to the co-caller identifier that is included in the message ARQ among the records of the address table 84-11 (indicated by symbol (4) in FIG. 17).

For example, the IP address of the gatekeeper 80-21 is acquired by performing one of the following operations:

The gatekeeper 80-21 has a database in which the unique gatekeeper IP address corresponding to the above destination party IP address is registered in advance. The IP address of the gatekeeper 80-21 is acquired by referring to this database.

Each gatekeeper (including the gatekeeper 80-21) has a database in which the IP addresses of the terminals accommodated by itself are registered in advance. The gatekeeper 80-21 broadcasts, to the other gatekeepers, packets that are an inquiry including the above destination party IP address, and extracts the IP address of the gatekeeper 80-21 from a predetermined field of packets that are received as a response to the inquiry packets.

However, the above operation can be realized by using various known communication protocols and is not an essential feature of the invention, and hence will not be described any further.

By cooperating with the gatekeeper 80-21 having the above IP address and other processing blocks via the LAN 61-11, the router 62-1, the internode link 63-12, the router 62-2, and the LAN 61-21, the terminal processing part 71-11 judges permission/refusal of termination at the terminal indicated by the above-mentioned co-caller identifier.

The procedure of the processing that is performed by the gatekeeper 80-21 to realize the above judgement is irrelevant to the invention and can be realized by using various known techniques, and hence will not be described.

When the judgement result is false, the terminal processing part 71-11 suspends the call setup for the call concerned.

On the other hand, when the judgement result is true, the terminal processing part 71-11 continues the call setup by exchanging, in the form of IP packets (IP datagrams), predetermined control information with the gatekeeper 80-11 and the gatekeeper 80-21 and the gateway 70GW-21 (indicated by symbol (8) in FIG. 17).

When the call concerned has become a successful call (i.e., a call with which the co-caller has made a response and thereby a state has been established that the co-caller and the originating party can exchange a speech signal), between the bases 60-11 and 60-21 a speech signal of the successful call is transmitted via the router 62-1, the internode link 63-12, and the router 62-2 in the form of a sequence of IP datagrams (indicated by symbol (9) in FIG. 17).

During the course of the above call setup, the gatekeepers 80-11 and 80-12 refer to the address tables 84-11 and 84-21 when necessary and update the values of the individual fields of the state management tables 85-11 and 85-21 according to the procedure of the call setup.

When the originating party (or destination party) is not a terminal that is accommodated by the LAN 61-11 (or 61-21), the individual parts of the gateway 70GW-11 (or 70GW-21) perform the following operations:

The interfacing part 73-11 (or 73-21) performs interfacing that relate to exchange of a signaling signal, a register signal, and a speech signal according to a signaling scheme suitable for the originating party (or destination party).

The protocol converting part 72-11 (or 72-21) maintains conditions under which the originating party (or destination party) that is accommodated via the interfacing part 73-11 (or 73-21) is equivalent to a terminal that is accommodated by the LAN 61-11 (or 61-21) during the course of the call setup and the exchange of the speech signal by performing, in a reversible manner, predetermined conversion processing on the signaling signal, register signal, and speech signal.

Therefore, the call setup for the above telephony call is continued only when the internode link 63-12 that is provided between the bases 60-11 and 60-21 that accommodate the originating party and the destination party of the call, respectively, via the routers 62-1 and 62-2 have a surplus bandwidth, and a speech signal of the call is transmitted via the internode link 63-12 as a sequence of IP datagrams.

Surplus bandwidths of the internode links 63-12 and 63-23 are secured as bandwidths to be used for transmission of a speech signal of a telephony call even in a case where a WAN (wide area network) having a narrow bandwidth such as a VPN (virtual private network) is used for the internode links 63-12 and 63-23. Therefore, the speech quality is kept high in a stable manner though a speech signal is transmitted via a best effort type or connectionless network.

In the conventional example described above, the judgement as to whether a bandwidth to be used for transmission of a speech signal of a telephony successful call that has newly occurred can be secured within a surplus bandwidth of an internode link is performed based on the following assumptions by determining which of the number of successful calls that can persist parallel for respective combinations of bases that accommodate the originating party and the destination party of each successful call, respectively, and a maximum number (equal to the above-mentioned number N) that conforms to the transmission capacity of the internode link is larger:

Bandwidths to be used for the transmission of speech signals of respective successful calls are the same and are kept constant.

Only one internode link is provided between the bases that accommodate an originating party and a destination party, respectively, and the transmission capacity of each internode link is kept constant.

However, for example, the speech signal that is transmitted via the internode link 63-12 as a sequence of IP datagrams may include not only a speech signal to be transmitted between terminals located in the respective bases 60-11 and 60-21 but also a speech signal to be transmitted between a terminal located in one of the bases 60-11 and 60-12 and a terminal located in one of the bases 60-21, 60-22, 60-31, and 60-32.

That is, although the traffic volumes of the internode links 63-12 and 63-23 are not necessarily the same, surplus transmission bandwidths of the respective internode links 63-12 and 63-23 are not recognized individually.

Therefore, the criteria for the above-described second judgement are not necessarily proper as criteria for the judgement as to whether a bandwidth that is necessary for the transmission of a speech signal of a successful call that newly occurs can be actually secured within a surplus bandwidth of the internode link 63-12.

Further, in the conventional example, it is possible that one of the internode links 63-12 and 63-23 is congested due to concentration of much more traffic on it than on the other and, as a result, the speech quality and the transmission quality deteriorate.

SUMMARY OF THE INVENTION

An object of the present invention is to provide a bandwidth management apparatus, an address resolution assisting apparatus, a bandwidth managing method, and an address resolution assisting method, which realize maintaining of good speech quality and transmission quality in a stable manner irrespective of the scale and the configuration of the topology of a network and the like.

Another object of the invention is to perform bandwidth management of the links constituting a network in a unified manner, irrespective of the configuration and the scale of the network, and to stably maintain good speech quality and transmission quality of a call whose communication information is to be transmitted as a sequence of datagrams.

Another object of the invention is to properly and flexibly maintain the speech quality and the transmission quality of a call even in a case where a bandwidth to be used for transmitting communication information of the call may vary during the course of call setup for the call.

Another object of the invention is to loosely keep relations among the call setup for a call whose communication information is to be transmitted as a sequence of datagrams, the bandwidth management, and the address resolution, irrespective of the configuration and the scale of a network, and to secure flexibility in the configuration of the network without lowering the service quality.

Another object of the invention is to realize a flexible response to the traffic distribution of links and highly maintain the speech quality and the transmission quality.

Still another object of the invention is to effectively use the bandwidths of links and to prevent the speech quality, the transmission quality, and the service quality from being unduly deteriorated.

Yet another object of the invention is to stably and highly maintain the speech quality, the transmission quality, and the service quality.

A further object of the invention is to stably perform the call setup for a call whose communication information is to be transmitted as a sequence of datagrams while flexibly adapting to both of the traffic distribution and the bandwidth management.

Another object of the invention is to keep the service quality and the transmission quality high in a stable manner.

Another object of the invention is to simplify the processing and expedite the bandwidth management.

Another object of the invention is to simplify the processing and expedite selection of a link used for transmitting communication information and the bandwidth management.

Still another object of the invention is to achieve flexible adaptation to an event or condition that may be recognized during the process of call setup such as a traffic distribution and a network configuration.

A further object of the invention is to efficiently perform various kinds of work such as expansion, modification, and a transfer at a low cost in the maintenance and operation of a communication system to which the invention is applied, and to highly maintain the total reliability.

A bandwidth managing apparatus according to the invention determines a link where a route to be used for transmission of communication information can be formed, when a call whose communication information is to be transmitted as a sequence of datagrams is assigned, judges whether a surplus bandwidth of the determined link is sufficient for all of its sections, and preferentially allocates the surplus bandwidth to the call, and informs, of a judgement result, an apparatus involved in call setup for the call. A bandwidth managing method for realizing the above bandwidth management apparatus is also provided.

In the bandwidth management apparatus having the above configuration and the bandwidth managing method, it is confirmed in a process of call setup that a route used for transmitting communication information can be secured within a surplus bandwidth, in all sections of a link where the route is formed; and a bandwidth necessary for transmitting the communication information is also secured.

The above objects are achieved by the bandwidth management apparatus which cooperates with a router provided in a determined link and updates a bandwidth to be allocated to a call. The bandwidth is included in bandwidths of the determined link.

In the bandwidth management apparatus having the above configuration, the bandwidths of individual routes where communication information is to be transmitted as a sequence of datagrams, are dynamically secured within a maximum bandwidth to which a router can respond. The router is provided in the link where the above routes are formed.

The above objects are achieved by a bandwidth management apparatus which judges, at a predetermined frequency, whether a successful call recognized persists, and releases a bandwidth used for transmitting communication information of the successful call whose judgement result is false.

In the bandwidth management apparatus having the above configuration, it is possible to reliably release the bandwidths of individual links used for transmitting communication information of a successful call even when recognizing the successful call that disappeared for some reason, is delayed or is not performed.

The above objects are also achieved by a bandwidth management apparatus which updates a bandwidth preferentially allocated prior to a successful call recognized, to a bandwidth adjusted according to a call setup procedure and necessary for transmission of communication information between an originating party and a destination party of the successful call.

In the bandwidth management apparatus having the above configuration, the bandwidth of a link is effectively used in a stable manner even in a case where there is an increase or a decrease in a bandwidth to be used for transmitting communication information as a sequence of datagrams, or a bandwidth used for the transmitting may be too large or insufficient when a call becomes a successful call.

The above objects are attained by a bandwidth management apparatus which: judges whether a surplus bandwidth in a determined link is sufficient for being allocated, as a bandwidth adjusted according to a call setup procedure and necessary for transmission of communication information between an originating party and a destination party of a successful call recognized; and informs an apparatus relating to a call setup for the successful call of the judgement result.

In the bandwidth management apparatus having the above configuration, the call setup is performed with high reliability by performing unified bandwidth management of links, even when there is an increase or a decrease in a bandwidth to be used for transmitting communication information, or a bandwidth used for the transmitting becomes too large or insufficient when a call becomes a successful call.

The above objects are achieved by a bandwidth management apparatus which judges whether a surplus bandwidth in a determined link is sufficient for being allocated, as a bandwidth to be used for transmission of communication information.

In the bandwidth management apparatus having the above configuration, the speech quality and the transmission quality of a call are kept properly and flexibly even in a case where the bandwidth to be used for the transmission of communication information as a sequence of datagrams may vary during the course of call setup.

The above objects are achieved by a bandwidth management apparatus which shares routing information exchanged between routers that are provided in each of the determined links, and determines a link to be used for transmitting communication information according to the routing information.

In the bandwidth management apparatus having the above configuration, it is possible to make a flexible and reliable response in response to changes in the configuration, scale, condition, etc. of a network, and to properly use the bandwidths of individual links.

The above objects are also attained by a bandwidth management apparatus which updates routing information set for routers, in accordance with condition of a determined link, and secures an alternate link.

In the bandwidth management apparatus having the above configuration, a bandwidth to be used for transmitting communication information in individual links is secured flexibly in response to a variety of events such as occurrence of a failure and a congestion.

The above objects are further attained by a bandwidth management apparatus which estimates a surplus bandwidth of a determined link as a multiple of a bandwidth necessary for transmission of communication information of a single successful call.

In the bandwidth management apparatus having the above configuration, as far as a call whose communication information is to be transmitted as a sequence of datagrams is concerned, in a process of the bandwidth management a bandwidth to be used for the transmission and a bandwidth to be released are recognized as the number of successful calls persisting in parallel.

Further, the above objects are achieved by an address resolution assistance apparatus which: obtains information representing a link where a route used for transmission of communication information of a call is to be formed or information necessary to determine the link, by cooperating with an originating party of the call in a process of the call setup; and informs, of the obtained information, a bandwidth management apparatus for managing bandwidths of the link. An address resolution assisting method for realizing the above address resolution assistance apparatus is also provided.

In the address resolution assisting apparatus having the above configuration and the address resolution assisting method, communication information is transmitted stably as a sequence of datagrams since assistance necessary to perform the bandwidth management of routes is given, and an address to be included in parallel in datagrams as an identifier indicating a destination, and a telephone number of the originating party or the destination party of a call are interconverted in a unified manner. The routes are used for transmitting communication information.

The above objects are achieved by an address resolution assistance apparatus which inquires one or both of the originating party and the destination party of a successful call assigned about whether the successful call persists, in response to an external request, and informs the bandwidth management apparatus of a result of the inquiry.

In the address resolution assistance apparatus having the above configuration, even in a case where the recognition of a successful call that disappeared for some reason is delayed or is not performed, an opportunity to release the bandwidth of a link used for transmitting communication information of the successful call can be reliably obtained.

The above objects are achieved by an address resolution assistance apparatus which inquires one or both of the originating party and the destination party of a successful call assigned about whether the successful call assigned persists and informs the bandwidth management apparatus of a result of the inquiry.

In the address resolution assistance apparatus having the above configuration, even in a case where the recognition of a successful call that disappeared for some reason is delayed or is not performed, an opportunity to release the bandwidth of individual links used for transmission of communication information of the successful call can be obtained with reliability.

Moreover, the above objects are achieved by an address resolution assistance apparatus which acquires a bandwidth determined according to a call setup procedure and informs the bandwidth management apparatus of the acquired bandwidth. The bandwidth is to be used for transmission of communication information between the originating party and the destination party of a successful call assigned.

In the address resolution assistance apparatus having the above configuration, the call setup is performed with high reliability under unified bandwidth management of links even in a case where there is an increase or a decrease in the bandwidth to be used for the transmission, or the bandwidth used for the transmission become too large or insufficient when a call becomes a successful call.

Further, the above objects are attained by an address resolution assistance apparatus which estimates a bandwidth to be used for transmission of communication information as the number of successful calls.

In the address resolution assistance apparatus having the above configuration, as far as a call whose communication information is to be transmitted as a sequence of datagrams is concerned, a bandwidth to be used for the transmission and a bandwidth to be released are recognized as the numbers of successful calls which persist in parallel in a process of the bandwidth management.

The above objects are achieved by an address resolution assistance apparatus which is given a bandwidth to be used for transmission of communication information of a call, as a part of information necessary to determine a link in a process of call setup for the call, and informs the bandwidth management apparatus of the given bandwidth.

In the address resolution assistance apparatus having the above configuration, the bandwidth of a link secured by the bandwidth management apparatus and to be used for the transmission can be set or updated during the course of call setup, when necessary.

Further objects and characteristic features of the invention will be elucidated from the following detailed explanation based on the accompanying drawings.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 4 shows the structure of a route information table;

FIG. 5 shows the structure of a bandwidth management table;

FIG. 6 shows the structure of a route management table;

FIGS. 8a–c are flowcharts showing the operations of a bandwidth management server in the first to fourth embodiment of the invention;

FIG. 10 shows the structures of messages that are passed between the gatekeeper, the bandwidth management server, and routers;

FIG. 11 is a graph showing examples of bandwidths that are allocated to a router and a telephony call;

FIG. 15 shows the structure of an address table;

FIG. 16 shows the structure of a state management table; and

FIG. 17 shows the operation of the conventional example.

DESCRIPTION OF THE PREFERRED EMBODIMENTS

First, the principles of the present invention will be described with reference to the drawings.

Figure 1:
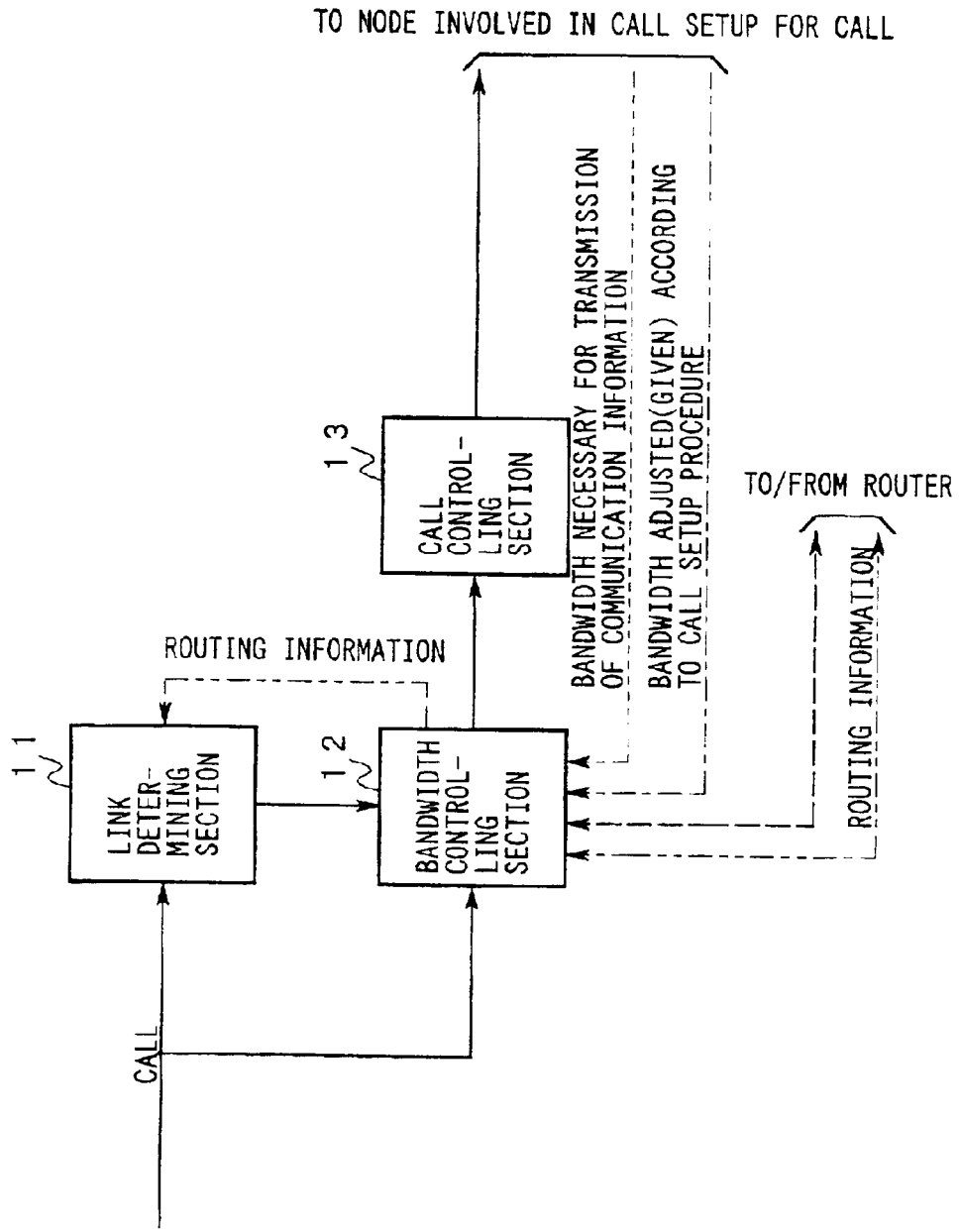
FIG. 1 is a block diagram showing the principles of bandwidth management apparatuses according to the present invention.

FIG. 1 is a block diagram showing the principles of bandwidth management apparatuses according to the invention.

Each bandwidth management apparatus shown in FIG. 1 is composed of a link determining section 11, a bandwidth controlling section 12, and a call controlling section 13.

In a first bandwidth managing apparatus according to the invention, the link determining section 11 determines, when a call whose communication information is to be transmitted as a sequence of datagrams is assigned, a link to be used for transmission of the communication information. The bandwidth controlling section 12 judges whether there exists a surplus bandwidth in all sections of the determined link, and allocates the call to a bandwidth necessary for transmission of the communication information when the judgement result is true. The call controlling section 13 informs, of the judgement result, a node that is involved in call setup for the call.

With this configuration, it is confirmed in a process of the call setup that a route to be used for transmitting communication information can be secured within a surplus bandwidth, in all sections of a link where the route is to be formed, and a bandwidth necessary for the transmitting is secured.

Therefore, the bandwidth management on the links constituting a network is performed in a unified manner, and good speech quality and transmission quality can be maintained in a stable manner irrespective of the configuration and the scale of the network.

In a second bandwidth management apparatus according to the invention, the bandwidth controlling section 12 judges whether there exists a bandwidth, which is greater than or equal to a bandwidth given according to a call setup procedure and necessary for transmission of communication information, in the determined link by the link determining section 11.

With this configuration, even in a case where the bandwidth to be used for transmission of communication information as a sequence of datagrams may vary during the course of call setup, the speech quality and the transmission quality of the call are maintained in a proper and flexible manner.

In a third bandwidth management apparatus according to the invention, the bandwidth controlling section 12 updates a bandwidth to be allocated to a call whose communication information is to be transmitted as a sequence of datagrams by cooperating with all or a part of routers provided as nodes in the determined link. The bandwidth is included in the bandwidths of the determined link.

With this configuration, the bandwidths of respective routes where communication information is to be transmitted as a sequence of datagrams, are dynamically secured within a maximum bandwidth to which a router can respond. The router is provided in the link where the above routes are formed.

This makes it possible to realize a flexible response to the traffic distribution of links and highly maintain the speech quality and the transmission quality.

In a fourth bandwidth management apparatus according to the invention, the bandwidth controlling section 12 judges, at a predetermined frequency, whether successful calls recognized individually persist, and releases a bandwidth used for transmission of communication information of a successful call whose judgement result is false.

With this configuration, even in a case where recognizing a successful call that disappeared for some reason is delayed or is not performed, the bandwidths of individual links that have been used for transmission of communication information of the successful call can be reliably released.

Therefore, the bandwidths of the links can be effectively used and the speech quality, the transmission quality, and the service quality are prevented from being deteriorated unduly.

In a fifth bandwidth management apparatus according to the invention, the bandwidth controlling section 12 updates a bandwidth preferentially allocated prior to a successful call recognized, to a bandwidth adjusted according to a call setup procedure and necessary for transmission of communication information between an originating party and a destination party of the successful call.

With this configuration, the bandwidth of a link is used with efficiency and stability even in a case where there is an increase or decrease in a bandwidth to be used for the transmission of communication information as a sequence of datagrams, or a bandwidth used for the transmission may be too large or insufficient when a call becomes a successful call.

Therefore, it is possible to highly maintain the speech quality, the transmission quality, and the service quality in a stable manner.

In a sixth bandwidth management apparatus according to the invention, the bandwidth controlling section 12 judges whether there exists a surplus bandwidth in the determined link. The surplus bandwidth is greater than or equal to a bandwidth adjusted according to a call setup procedure and necessary for transmission of communication information between an originating party and a destination party of a successful call that is assigned. The call controlling section 13 informs, of the judgement result, a node that is involved in call setup for the successful call.

With this configuration, the call setup is performed with high reliability under unified bandwidth management on links even in a case where there is an increase or a decrease in a bandwidth to be used for transmission of communication information, or a bandwidth used for the transmission may be too great or insufficient when a call becomes a successful call.

Therefore, the call setup for a call whose communication information is to be transmitted as a sequence of datagrams, is stably performed while adapted flexibly to both of the traffic distribution and the bandwidth management.

In a seventh bandwidth management apparatus according to the invention, the link determining section 11 shares routing information exchanged between routers that are provided as nodes in each of the determined links, and determines the links to be used for transmission of the communication information according to the routing information.

With this configuration, it is possible to make a flexible and reliable response in response to changes in the configuration, scale, condition, etc. of a network, and to properly use the bandwidths of individual links.

Therefore, the service quality and the transmission quality are highly maintained in a stable manner.

In an eighth bandwidth management apparatus according to the invention, the bandwidth controlling section 12 updates, in accordance with condition of the determined link, routing information set for all or a part of routers that are provided as nodes in the determined link, and secures its replacement link.

With this configuration, a bandwidth to be used for transmission of communication information in individual links are secured flexibly in response to a variety of events such as occurrence of a failure and a congestion.

Therefore, the service quality and the transmission quality are kept high in a stable manner.

In a ninth bandwidth management apparatus according to the invention, the bandwidth controlling section 12 estimates the surplus bandwidth of the determined link as a multiple of a bandwidth that is necessary for transmission of communication information of a single successful call.

With this configuration, as far as a call whose communication information is to be transmitted as a sequence of datagrams is concerned, in a process of the bandwidth management, a bandwidth to be used for the transmission of communication information and a bandwidth to be released are recognized as the number of successful calls persisting in parallel.

This makes it possible to simplify the processing and expedite the bandwidth management.

Figure 2:
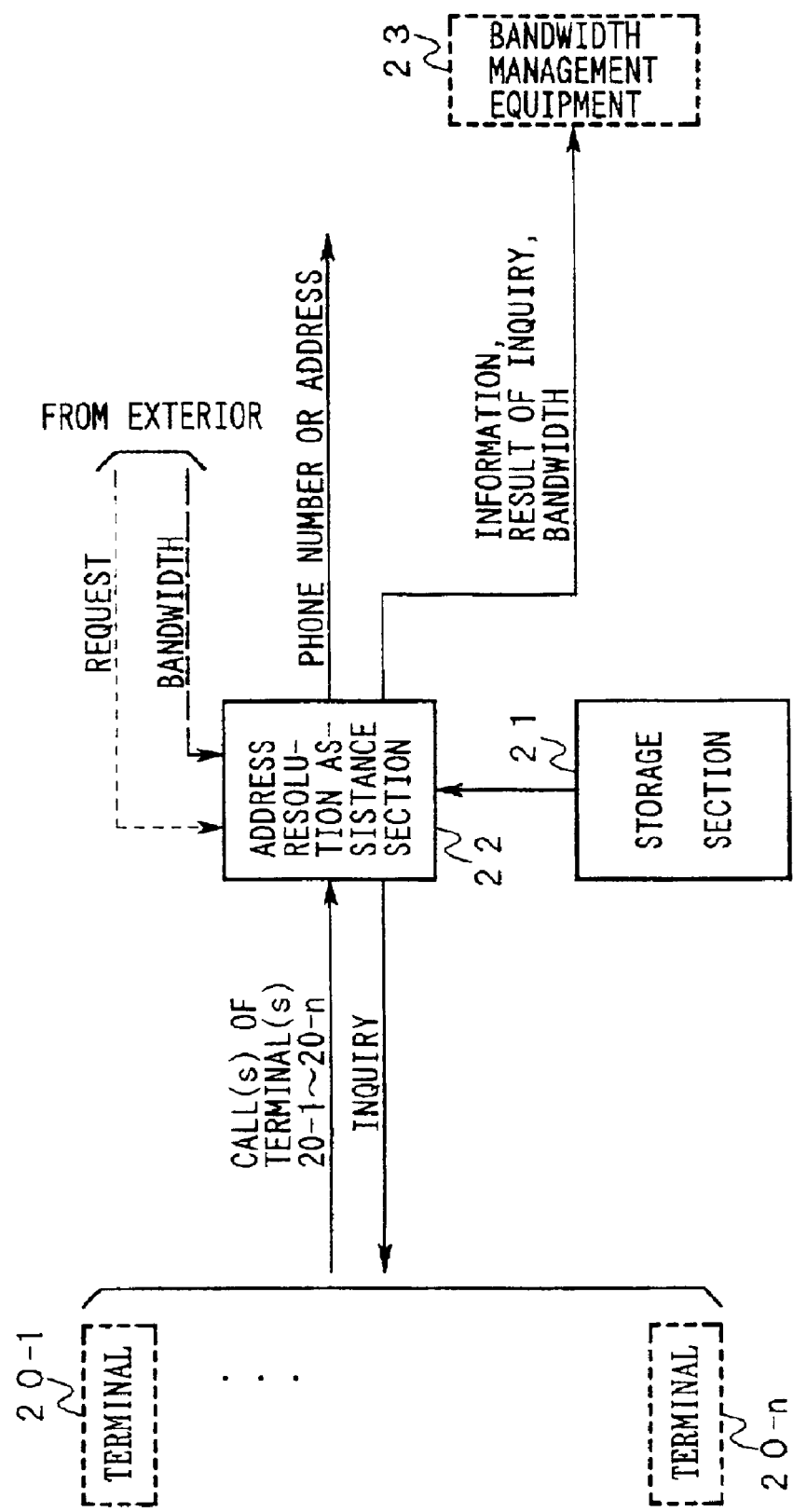
FIG. 2 showing the principles of address resolution assistance apparatuses according to the invention.

FIG. 2 is a block diagram showing the principles of address resolution assistance apparatuses according to the invention.

Each address resolution assistance apparatus shown in FIG. 2 is composed of a storage section 21, an address resolution assistance section 22, and a bandwidth management apparatus 23.

In a first address resolution assistance apparatus according to the invention, a pair of a telephone number and an address allocated to respective terminals 20-1 to 20-n that can become an originating party of a call whose communication information is to be transmitted as a sequence of datagrams, is stored in the storage section 21. The address resolution assistance section 22 refers to the storage section 21 in a process of call setup for individual calls of the terminals 20-1 to 20-n, and interconverts a telephone number and an address that are allocated to one or both of an originating party and a destination party of the call. The address resolution assistance section 22 further obtains information indicating a link to be used for transmission of communication information of the call or information necessary to determine the link, by cooperating with the originating party of the call, and informs the bandwidth management apparatus 23 for managing bandwidth of the link, of the determined information.

With this configuration, assistance necessary to perform the bandwidth management of routes, which are used for transmitting communication information, is given, and an address to be included in parallel in datagrams as an identifier indicating a destination, and a telephone number of the originating party or the destination party of a call concerned are interconverted in a unified manner. Therefore, the communication information is stably transmitted as a sequence of datagrams.

Further, it is possible to loosely keep relations among the call setup for a call whose communication information is to be transmitted as a sequence of datagrams, the bandwidth management, and the address resolution, irrespective of the configuration and the scale of a network, and to secure flexibility in the configuration of the network without lowering the service quality.

In a second address resolution assistance apparatus according to the invention, when a call whose communication information is to be transmitted as a sequence of datagrams is assigned, a link to be used for transmission of the communication information is determined. Whether there exists a surplus bandwidth in all sections of the determined link is judged. The call is allocated to a bandwidth necessary for transmission of the communication information when the judgement result is true. A node that is involved in call setup for the call is informed of the judgement result.

With this configuration, it is confirmed in a process of the call setup that a route to be used for the transmission of communication information can be secured within the surplus bandwidth, in all sections of a links where the route is to be formed. A bandwidth necessary for the transmission of the communication information is secured.

Therefore, the bandwidth management of the link constituting a network is performed in a unified manner, and good speech quality and transmission quality can be stably maintained, irrespective of the configuration and the scale of the network.

In a third address resolution assistance apparatus according to the invention, given in advance is a pair of a telephone number and an address that are allocated to respective terminals 20-1 to 20-n that can become an originating party of a call whose communication information is to be transmitted as a sequence of datagrams. In a process of call setup for individual calls of each of the terminals 20-1 to 20-n, a telephone number and an address that are allocated to one or both of an originating party and a destination party are interconverted. Information indicating a link to be used for transmission of communication information of the call, or information necessary to determine the link is obtained, by cooperating with the originating party of the call. The bandwidth management apparatus 23 for managing bandwidths of the link is informed of the obtained information.

With this configuration, assistance necessary to perform the bandwidth management of routes, which are used for transmitting communication information, is given, and an address to be included in parallel in datagrams as an identifier indicating a destination, and a telephone number of the originating party or the destination party of a call concerned are interconverted in a unified manner. Therefore, the communication information is stably transmitted as a sequence of datagrams.

Further, the relations among the call setup, the bandwidth management, and the address resolution is loosely maintained irrespective of the configuration and the scale of a network, and flexibility in the configuration of the network is maintained without lowering the service quality.

In a fourth address resolution assistance apparatus according to the invention, the address resolution assistance section 22 inquires one or both of an originating party and a destination party of a successful call assigned about whether the successful call persists, in response to an external request relating to the successful call, and informs the bandwidth management apparatus 23 of a result of the inquiry.

With this configuration, even in a case where the recognition of a successful call that disappeared for some reason is delayed or is not performed, an opportunity to release the bandwidth of the link used for the transmission of communication information of the successful call can be obtained with reliability.

Therefore, the bandwidth of the link can be effectively used and the speech quality, the transmission quality, and the service quality are prevented from being deteriorated unduly.

In a fifth address resolution assistance apparatus according to the invention, the address resolution assistance section 22 inquires one or both of an originating party and a destination party of a successful call assigned, about whether the successful call persists, and informs the bandwidth management apparatus 23 of a result of the inquiry.

With this configuration, even in a case where the recognition of a successful call that disappeared for some reason is delayed or is not performed, an opportunity to release the bandwidths of the individual links used for the transmission of communication information of the successful call can be reliably obtained.

Therefore, the bandwidths of the links can be effectively used and the speech quality, the transmission quality, and the service quality are prevented from being deteriorated unduly.

In a sixth address resolution assistance apparatus according to the invention, the address resolution assistance section 22 acquires a bandwidth that is determined according to a call setup procedure and used for transmission of communication information between an originating party and a destination party of a successful call assigned, and informs the bandwidth management apparatus 23 of the acquired bandwidth.

With this configuration, the call setup is performed with high reliability under unified bandwidth management on links even in a case where there is an increase or a decrease in a bandwidth to be used for the transmission of communication information, or a bandwidth used for the transmission become too great or insufficient when a call becomes a successful call.

Therefore, the call setup for a call whose communication information is to be transmitted as a sequence of datagrams is performed with stability while adapted flexibly to both of the traffic distribution and the bandwidth management.

In a seventh address resolution assistance apparatus according to the invention, the address resolution assistance section 22 estimates a bandwidth to be used for transmission of communication information as the number of successful calls.

With this configuration, as far as a call whose communication information is to be transmitted as a sequence of datagrams is concerned, in a process of the bandwidth management, a bandwidth to be used for the transmission of communication information and a bandwidth to be released are recognized as the number of successful calls persisting in parallel.

This makes it possible to simplify the processing and expedite the selection of a link to be used for the transmission and the bandwidth management.

In an eighth address resolution assistance apparatus according to the invention, the address resolution assistance section 22 is given a bandwidth to be used for transmission of communication information of a call, as a part of information necessary to determine a link in a process of call setup for the call, and informs the bandwidth management apparatus 23 of the given bandwidth.

With this configuration, a bandwidth of a link secured by the bandwidth management apparatus 23 and used for the transmission of communication information can be set or updated during the course of call setup, when necessary.

This realize flexible adaptation to an event or condition that may be recognized during the course of call processing such as a traffic distribution and a network configuration.

In a ninth address resolution assistance apparatus according to the invention, whether there exists a bandwidth in the determined link is judged. The bandwidth is greater than or equal to a bandwidth given according to a call setup procedure and necessary for transmission of communication information.

With this configuration, the bandwidths in individual sections of the link to be used for the transmission of communication information are set or updated during the course of call setup, when necessary.

This realizes flexible adaptation to an event or condition that may be recognized during the course of call processing such as a traffic distribution and a network configuration.

The embodiments of the invention will be hereinafter described in detail with reference to the drawings.

Figure 3:
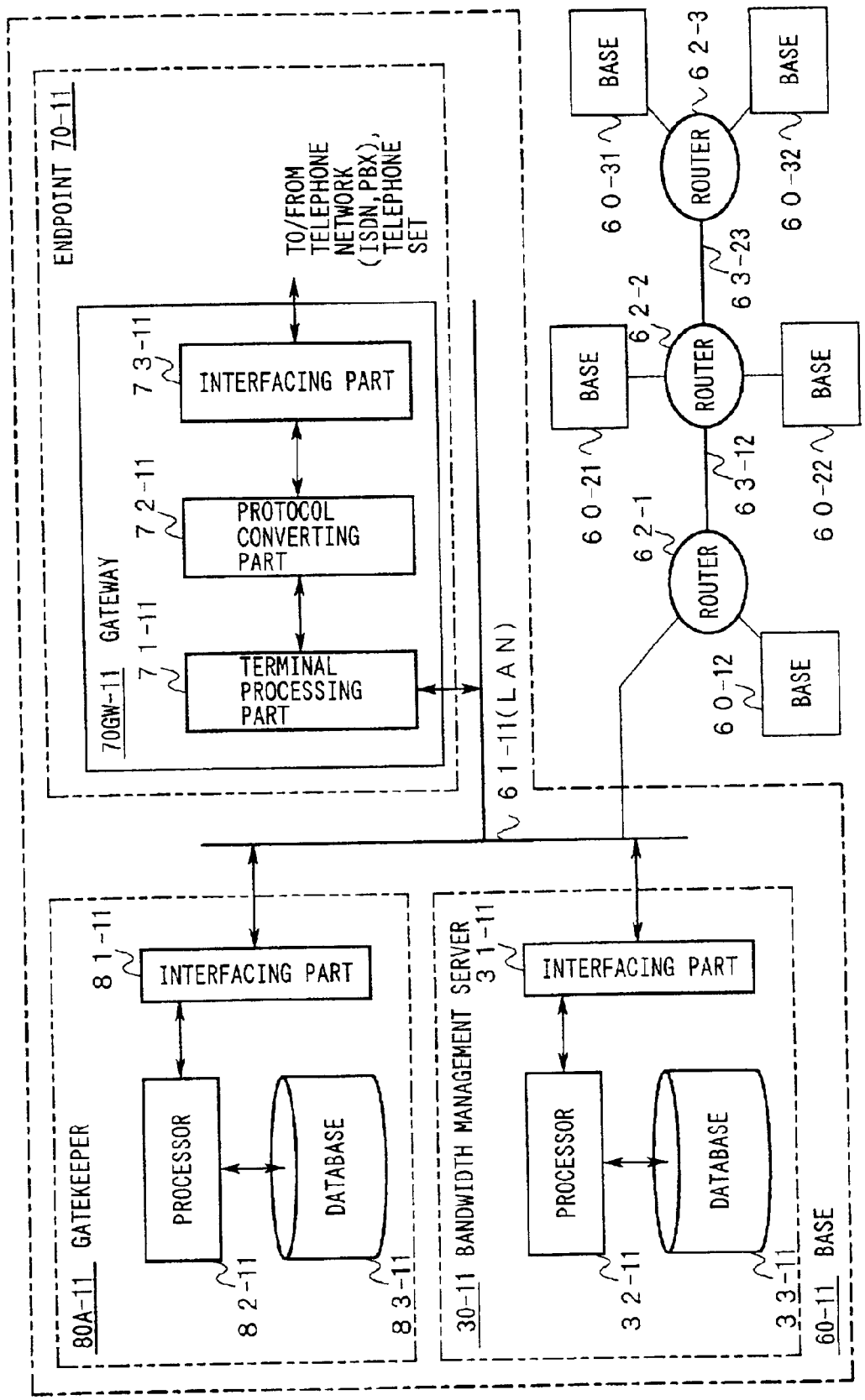
FIG. 3 shows first to fourth embodiments of the invention.
Figure 14:
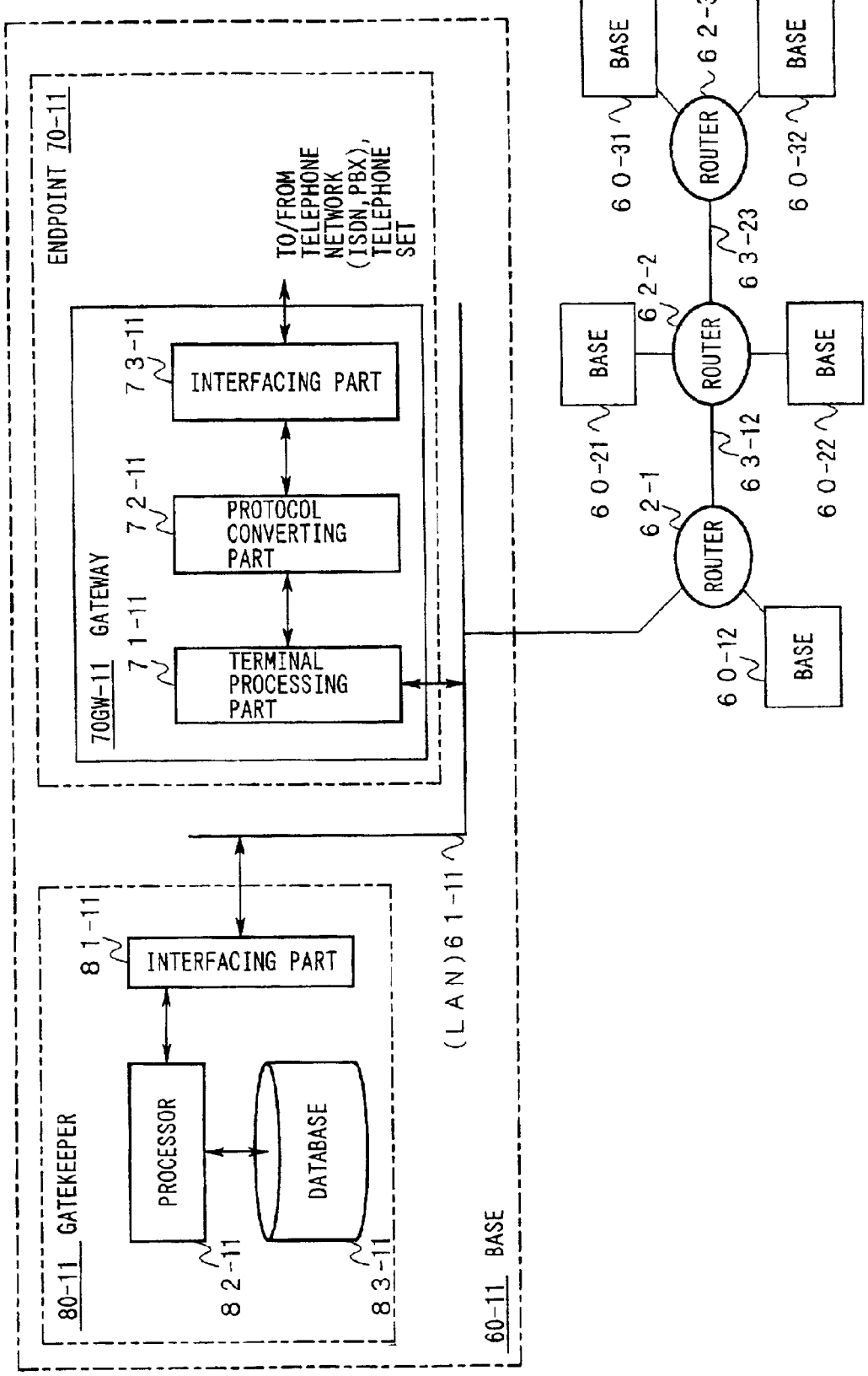
FIG. 14 shows the configuration of an exemplary network to which the VoIP is applied.

FIG. 3 shows first to fourth embodiments of the invention. The blocks in FIG. 3 having the same blocks in FIG. 14 are given the same symbols as the latter and will not be described below.

This embodiment is mainly characterized by the following:

The bases 60-11, 60-12, 60-21, 60-22, 60-31, and 60-32 are provided with gatekeepers 80A-11, 80A-12, 80A-21, 80A-22, 80A-31, and 80A-32 in place of the gatekeepers 80-11, 80-12, 80-21, 80-22, 80-31, and 80-32, respectively.

The base 60-11 is provided with a bandwidth management server 30-11 that is connected to the LAN 61-11.

The bandwidth management server 30-11 is composed of the following components:

An interfacing part 31-11 that is connected to the LAN-61-11.

A processor 32-11 having a bus or port that is connected to the interfacing part 31-11.

A database 33-11 that is accessed by the processor 32-11 when necessary.

The database 33-11 is composed of a route information table 41, a bandwidth management table 42, and a route management table 43 which will be described below.

As shown in FIG. 4, the route information table 41 is a set of records each of which is a combination of the following fields and corresponds to a pair of bases where the originating party and the destination party, respectively, of a telephony successful call that can occur are located:

An originating base identifier field in which an originating base identifier indicating a base where the originating party of a successful call is located is stored in advance.

A destination base identifier field in which a destination base identifier indicating a base where the destination party of the successful call is located is stored in advance.

A route information field in which a series (hereinafter referred to as "route information") of identifiers (hereinafter be referred to as "route identifiers") of a pair of routers located at both ends of each internode link (link) to be used for the transmission of a speech signal of the successful call is stored in advance.

As shown in FIG. 5, the bandwidth management table 42 is a set of records each of which is a combination of the following fields and corresponds to one of all the routers:

A route identifier field in which every route that can be used for the transmission of a speech signal of a successful call is stored in advance as an identifier of a pair of routers.

An upper limit bandwidth field in which an upper limit bandwidth that can be allocated to the route indicated by the route identifier based on the structure of a network is stored in advance.

A maximum bandwidth field in which a maximum bandwidth that is actually allocated to the route indicated by the route identifier and can be used for the transmission of predetermined traffic (assumed here to be only a speech signal, for simplicity) is stored.

A current bandwidth field in which a bandwidth (hereinafter referred to as "current bandwidth") that is part of the maximum bandwidth and is actually used for the transmission of a speech signal is stored.

As shown in FIG. 6, the route management table 43 is a set of records each of which is a combination of the following fields:

A call identifier field in which an identifier (hereinafter referred to as "call identifier") indicating a successful call that has occurred is stored.

A route information field in which a series (hereinafter referred to as "route information") of identifiers (hereinafter be referred to as "route identifiers") of a pair of routers located at both ends of each internode link to be used for the transmission of a speech signal of the successful call indicated by the call identifier is stored.

Figure 7:
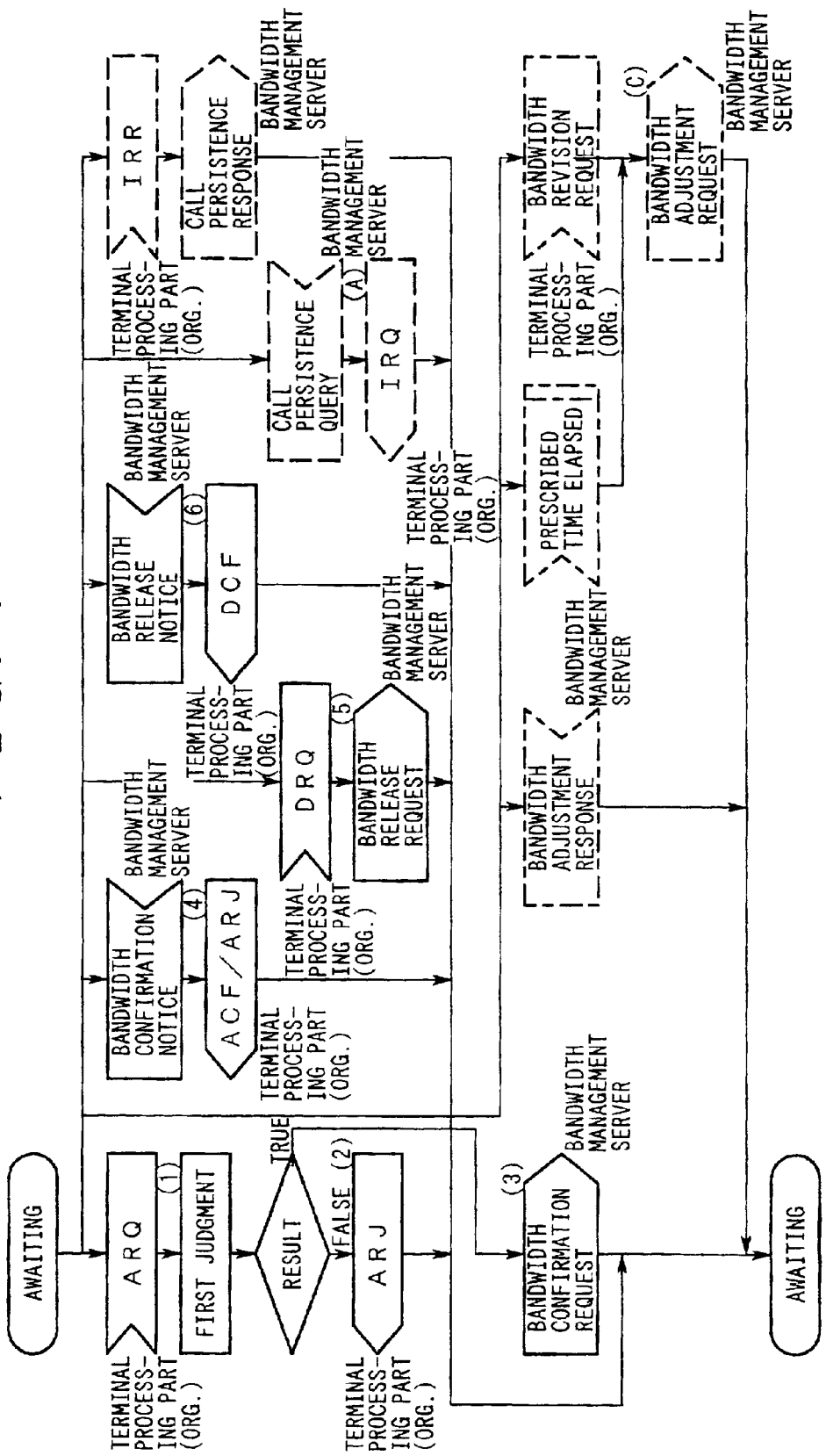
FIG. 7 is a flowchart showing the operations of a gatekeeper in the first to fourth embodiment of the invention.
Figure 8B:
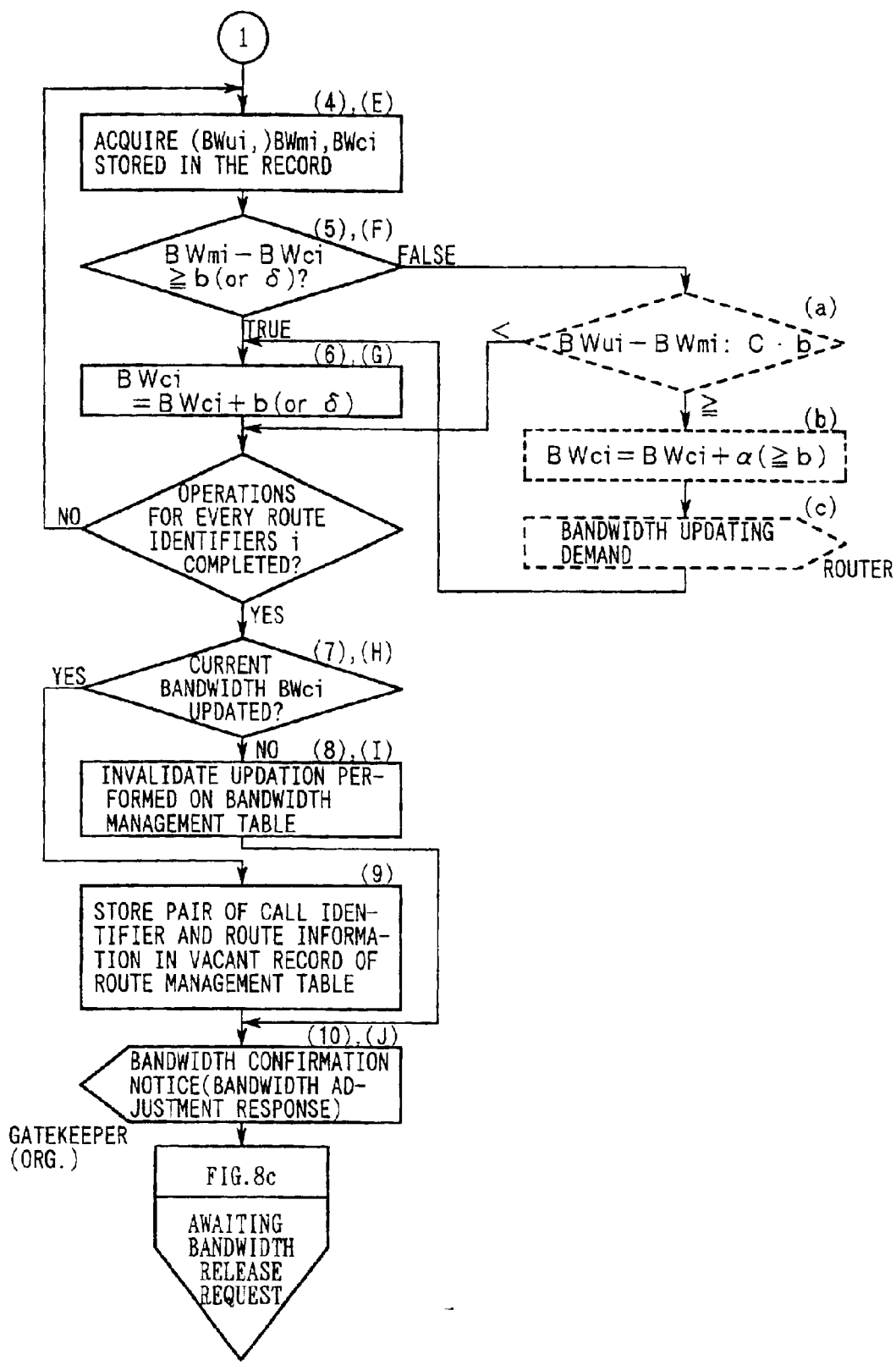
Figure 8C:
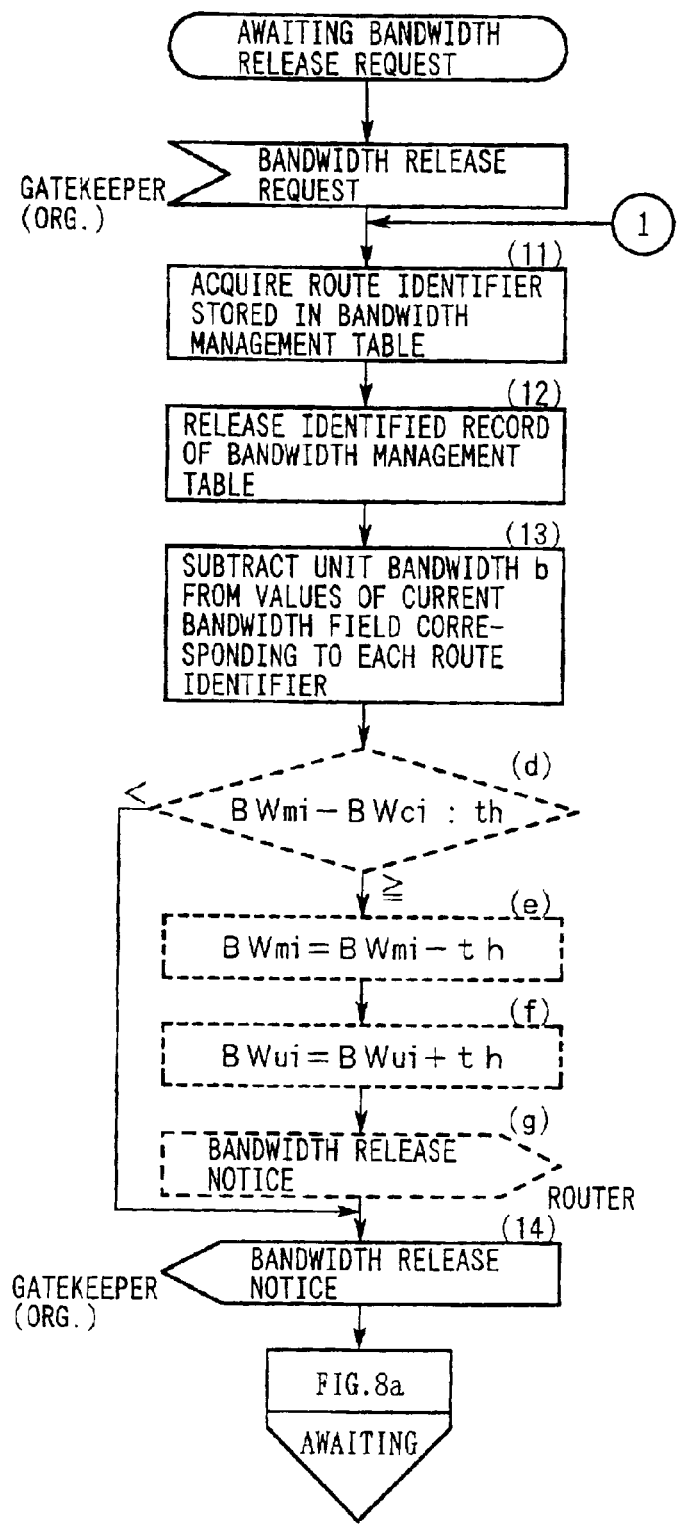
Figure 9:
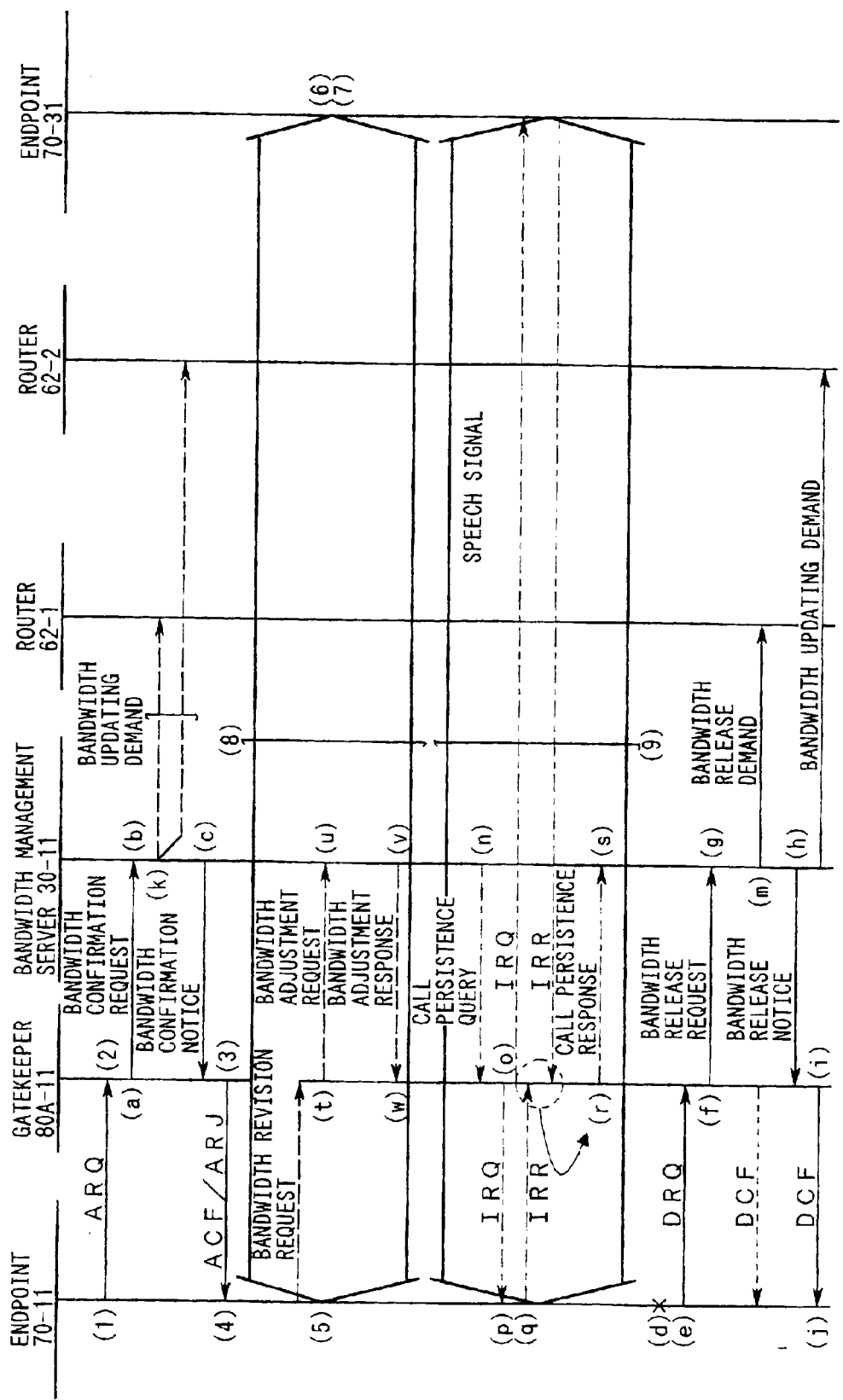
FIG. 9 is a diagram showing the operations of the first to fourth embodiments.

FIG. 7 is a flowchart showing the operations of gatekeeper according to the first to fourth embodiments of the invention. FIGS. 8a–c is a flowchart showing the operations of the bandwidth management server according to the first to fourth embodiments of the invention. FIG. 9 is a flowchart showing the operations of the first to fourth embodiments of the invention. In FIG. 9, symbols (1)–(9) correspond to instants or operations of the conventional example that are denoted by symbols (1)–(9) in FIG. 17, respectively.

The operation of the first embodiment of the invention will be described below with reference to FIGS. 3–9.

This embodiment is mainly characterized by the procedure of the following processing that is performed by the gatekeeper 80A-11 and the bandwidth management server 30-11 in cooperation.

In the following description, for simplicity, it is assumed that the originating party of a telephony call whose speech signal should be transmitted as a sequence of IP datagrams is located in the base 60-11 as in the conventional example but its destination party is located in the base 60-31 rather than the base 60-21.

In the base 60-11, at the time of call origination the terminal processing part 71-11 sends a message ARQ to the gatekeeper 80A-11 via the LAN 61-11 by performing the same operation as in the conventional example (indicated by symbol (1) in FIG. 9).

When recognizing the message ARQ, the gatekeeper 80A-11 performs the first judgement by performing the same operation as in the conventional example (indicated by symbol (1) in FIG. 7 and symbol (2) in FIG. 9).

When the result of the first judgement is false, the gatekeeper 80A-11 sends the terminal processing part 71-11 a message indicating that the call setup for the call concerned should be suspended (indicated by symbol (2) in FIG. 7).

On the other hand, when the result of the first judgement is true, the gatekeeper 80A-11 generates a bandwidth confirmation request (denoted by symbol (a) in FIG. 10) that contains a call identifier indicating the call concerned and the telephone numbers (or IP addresses) of the originating terminal and the destination terminal of the call and sends the generated bandwidth confirmation request to the bandwidth management server 30-11 via the LAN 61-11 (indicated by symbol (3) in FIG. 7 and symbol (a) in FIG. 9).

When recognizing the bandwidth confirmation request, the bandwidth management server 30-11 (processor 32-11) identifies bases where the originating party and the destination party are located by analyzing the individual telephone numbers (or IP addresses) contained in the bandwidth confirmation request and acquires the originating base identifier and the destination base identifier indicating those bases (indicated by symbol (1) in FIG. 8a and symbol (b) in FIG. 9).

The analysis of the telephone numbers (or IP addresses) is performed based on a numbering plan (or rules relating to the allocation of IP addresses) that is used in giving telephone numbers (or IP addresses) to the terminals located in the bases 60-11, 60-12, 60-21, 60-22, 60-31, and 60-32 and that is given as known information.

The bandwidth management server 30-11 identifies a record corresponding to the above pair of identifiers, that is, the originating base identifier and the destination base identifier, among the records of the route information table 41 that conforms to the structure of the network (indicated by symbol (2) in FIG. 8a), and acquires route information I that is stored in the route information field of the identified record (indicated by symbol (3) in FIG. 8a).

The bandwidth management server 30-11 extracts all the route identifiers i contained in the route information I and performs the following series of operations individually in accordance with the value of the route identifier i:

(1) Identifies a record in which the value of the route identifier field is equal to the route identifier i among the records of the bandwidth management table 42, and acquires the maximum bandwidth BWmi and the current bandwidth BWci that are stored in the maximum bandwidth field and the current bandwidth field, respectively, of the identified record (indicated by symbol (4) in FIG. 8b).

(2) Judges whether the following inequality is satisfied for a unit bandwidth b (for simplicity, it is assumed here that the unit bandwidth b is given in advance as a known constant) that is required for the transmission of a speech signal of a single successful call (indicated by symbol (5) in FIG. 8b). When the judgement result is false, terminates the operations relating to the route identifier i.

$$BWmi - BWci \geq b$$

(3) Updates the current bandwidth BWci according to the following arithmetic operation (indicated by symbol (6) in FIG. 8b) and terminates the operations relating to the route identifier i.

$$BWci = BWci + b \qquad (1)$$

During the course of the operations performed for any of the values of the all route identifiers i, the bandwidth management server 30-11 performs the judgement (hereinafter referred to as "surplus-bandwidth sufficiency judgement") as to whether the current bandwidth BWci has been updated according to the arithmetic operation (1) (indicated by symbol (7) in FIG. 8b).

When the result of the surplus-bandwidth sufficiency judgement is false, the bandwidth management server 30-11 invalidates the above operations that were performed on the maximum bandwidth field and the current bandwidth field of the bandwidth management table 41 (indicated by symbol (8) in FIG. 8b).

On the other hand, when the result of the surplus-bandwidth sufficiency judgement is true, the bandwidth management server 30-11 stores a pair of the call identifier of the call concerned and the route information I in an vacant record of the route management table 43 (indicated by symbol (9) in FIG. 8b).

Then, the bandwidth management server 30-11 sends, to the gatekeeper 80A-11, via the LAN 61-11, a bandwidth confirmation notice (denoted by symbol (b) in FIG. 10) indicating the result of the surplus-bandwidth sufficiency judgement (indicated by symbol (10) in FIG. 8b and symbol (c) in FIG. 9).

The gatekeeper 80A-11 sends the terminal processing part 71-11 a message ACF/ARJ indicating the result of the surplus-bandwidth sufficiency judgement that is contained in the bandwidth confirmation notice (indicated by symbol (4) in FIG. 7 and symbol (3) in FIG. 9).

The operations (indicated by symbols (4)–(8) in FIG. 9) that are performed by the gatekeeper 80A-11, the state management table 85-11, and the individual parts of the apparatuses provided in the base 60-31 in cooperation to make the call concerned a successful call are basically the same as in the conventional example, and hence will not be described.

Between the LANs 61-11 and 61-31, a speech signal of such a successful call is transmitted via the router 62-1, the internode link 63-12, the router 62-2, the internode link 63-23, and the router 62-3 in the form of a sequence of datagrams (indicated by symbol (9) in FIG. 9).

The clearing of the successful call (for simplicity, it is assumed that the successful call is cleared being led by the originating party) is recognized by the terminal processing part 71-11 (indicated by symbol (d) in FIG. 9). The terminal processing part 71-11 sends a message DRQ containing the call identifier of the successful call to the gatekeeper 80A-11 via the LAN 61-11 (indicated by symbol (e) in FIG. 9).

The gatekeeper 80A-11 generates a bandwidth release request (denoted by symbol (c) in FIG. 10) containing the call identifier that is contained in the message DRQ, and sends the generated bandwidth release request to the bandwidth management server 30-11 via the LAN 61-11 (indicated by symbol (5) in FIG. 7 and symbol (f) in FIG. 9).

When recognizing the bandwidth release request, the bandwidth management server 30-11 identifies a record in which the value of the call identifier field is equal to the call identifier contained in the bandwidth release request among the records of the route management table 43. The bandwidth management server 30-11 releases the identified record after acquiring the route information that is stored in its route information field (indicated by symbols (I 1) and (12) in FIG. 8c).

Then, the bandwidth management server 30-11 identifies all records in which the value of the route identifier field is included in the route information among the records of the bandwidth management table 42, and subtracts the above-mentioned unit bandwidth b from the values of the current bandwidth fields of those records (indicated by symbols (13) in FIG. 8c and symbol (g) in FIG. 9).

After completion of the above operations, the bandwidth management server 30-11 sends, to the gatekeeper 80A-11, via the LAN 61-11, a bandwidth release notice (denoted by symbol (d) in FIG. 10) indicating the completion of the above operations and containing the call identification information of the call concerned (indicated by symbol (14) in FIG. 8c and symbol (h) in FIG. 9).

Sometime in the period from the instant of sending of the bandwidth release request to the instant of recognition of the bandwidth release notice, the gatekeeper 80A-11 sends, to the terminal processing part 71-11, via the LAN 61-11, a message DCF indicating the completion of the operations that should be performed by the gatekeeper 80A-11 and the bandwidth management server 30-11 in response to the clearing of the call (indicated by symbol (6) in FIG. 7 and symbol (i) in FIG. 9).

When recognizing the message DCF, the terminal processing part 71-11 performs clearing processing including release of the resources by cooperating with the individual parts of the base 60-31 that accommodates the destination terminal according to a predetermined procedure (indicated by symbol (j) in FIG. 9).

The procedure of the clearing processing is not an essential feature of the invention and can be realized by various known techniques, and hence will not be described in detail.

As described above, call processing for a telephony call is continued only when it is recognized that every internode link on a route along which a speech signal of the call should be transmitted as a sequence of IP datagrams can transmit it within a surplus bandwidth irrespective of the combination of bases where the originating party and the destination party of the call are located. The bandwidths of each internode link that have been used for the transmission of such a speech signal are released automatically and reliably upon clearing of the call.

Therefore, according to this embodiment, a bandwidth to be used for the transmission of a speech signal of a telephony call is secured flexibly and stably and the speech quality is kept high, for example, in a manner indicated by a chain line in FIG. 11 irrespective of the network topology and scale.

In this embodiment, a terminal as an originating party is located in the base 60-11 that is provided with the bandwidth management server 30-11 and a bandwidth to be used for the transmission of a speech signal of a successful call that has occurred in the terminal is secured in such a manner that the gatekeeper 80A-11 that is located in the base 60-11 cooperates with the bandwidth management server 30-11 mainly.

However, the invention is not limited to such a configuration. The bandwidth management server 30 may also be provided in a base where a destination terminal is located or a base where neither an originating terminal nor a destination terminal is any provided as long as control information necessary to realize operations equivalent to the above-described operations is exchanged reliably via the routers 62-1 to 62-3 and the internode links 63-12 and 63-23.

In this embodiment, the judgement as to whether the surplus bandwidth of each internode link is large enough to secure a bandwidth to be used for the transmission of a speech signal is realized by using a simple arithmetic operation including the above-mentioned unit bandwidth b with the assumption that the information amount of a speech signal and the bandwidth to be used for the transmission of a speech signal are constant for successful calls irrespective of the subscriber classes of an originating party and a destination party and other attributes.

However, for example, the above judgement maybe realized in the following forms:

Each of the above-described maximum bandwidth and current bandwidth is normalized by the above-mentioned unit bandwidth b and thereby represented by the number of successful calls, and a constant "1" is used instead of the unit bandwidth b. This simplifies the operations.

The terminal processing part 71, for example, sets the unit bandwidth b at a proper value in accordance with subscriber classes and other attributes, and passes the thus-set value to the gatekeeper 80A and the bandwidth management server 30 as part of the message ARQ and the bandwidth confirmation request. This makes it possible to attain desired service quality and transmission quality with high reliability.

A bandwidth to be used for actual transmission of a speech signal is determined in a negotiation that is performed between an originating party and a destination party according to the call setup procedure, and the determined bandwidth is passed to the gatekeeper 80A and the bandwidth management server 30 like the above-described unit bandwidth b. This makes it possible to attain service quality and transmission quality that are suitable for the performance of an originating party and a destination party and other situations as well as to use effectively the surplus transmission bandwidth of each internode link.

The operation of the second embodiment of the invention will be hereinafter described with reference to FIGS. 3–9.

This embodiment is mainly characterized by the following operations that are performed when the bandwidth management server 30-11 has recognized the above-described bandwidth confirmation request.

When recognizing the bandwidth confirmation request, the bandwidth management server 30-11 performs the following operation as in the case of the first embodiment:

Identifies bases where the originating party and the destination party are located, and acquires an originating base identifier and a destination base identifier indicating those bases (indicated by symbol (1) in FIG. 8a and symbol (b) in FIG. 9).

Identifies a record corresponding to the pair of the originating base identifier and the destination base identifier among the records of the route information table 41, and acquires route information that is stored in the route information field of the identified record (indicated by symbols (2) and (3) in FIG. 8a).

Then, the bandwidth management server 30-11 extracts all the route identifiers i contained in the route information and performs the following series of operations in accordance with the value of the route identifier i:

(a) Identifies a record in which the value of the route identifier field is equal to the route identifier i among the records of the bandwidth management table 42, and acquires the upper limit bandwidth BWui, the maximum bandwidth BWmi, and the current bandwidth BWci that are stored in the upper limit bandwidth field, the maximum bandwidth field, and the current bandwidth field, respectively, of the identified record (indicated by symbol (4) in FIG. 8b).

(b) Judges whether the following inequality is satisfied for a unit bandwidth b (for simplicity, it is assumed here that the unit bandwidth b is given in advance as a known constant) that is required for the transmission of a speech signal of a single successful call (indicated by symbol (5) in FIG. 8b). When the judgement result is false, performs the following operations (d) onward.

$$BWmi-BWci \geq b$$

(c) Updates the current bandwidth BWci according to the following arithmetic operation (indicated by symbol (6) in FIG. 8b) and terminates the operations relating to the route identifier i.

$$BWci=BWci+b \tag{1}$$

(d) Judges whether the following inequality is satisfied for a predetermined constant C (>1) (denoted by symbol (a) in FIG. 8b). When the judgement result is false, terminates the operations relating to the route identifier i.

$$BWui-BWmi \geq C \cdot b$$

(e) Updates the maximum bandwidth BWmi to a value α (≦BWui) that is greater than the original value by the unit bandwidth b or more (indicated by symbol (b) in FIG. 8b), and sends a bandwidth updating demand (denoted by symbol (e) in FIG. 10) indicating that the maximum bandwidth BWmi should be updated to the above value to the routers indicated by the respective router identifiers contained in the route identifier i (indicated by symbol (c) in FIG. 8b and symbol (k) in FIG. 9), and then performs the operation (c) again.

The operations (a)–(c) are the same as the operations (1)–(3) in the first embodiment, and the ensuing operations (d) and (e) are also performed in this embodiment.

During the course of the operations performed for any of the values of the all route identifier i, the bandwidth management server 30-11 performs the judgement (hereinafter referred to as "surplus-bandwidth sufficiency judgement") as to whether the current bandwidth BWci has been updated according to the arithmetic operation (1) (indicated by symbol (7) in FIG. 8b). In a process that the call concerned becomes a successful call, the bandwidth management server 30-11 performs the same operations as in the first embodiment (indicated by symbols (8)–(10) in FIG. 8b).

During the course of clearing operation of such a successful call, when recognizing a bandwidth release request that is sent from the gatekeeper 80A-11, the bandwidth management server 30-11 performs the following operations as in the case of the first embodiment:

Identifies a record in which the value of the call identifier field is equal to the call identifier contained in the bandwidth release request among the records of the route management table 43, and releases the identified record after acquiring all the route identifiers i contained in the route information that is stored in its route information field (indicated by symbols (11) and (12) in FIG. 8c).

Identifies all records (hereinafter referred to simply as "recovery records") in which the value of the route identifier field is equal to one of the route identifiers i among the records of the bandwidth management table 42, and subtracts the above-mentioned unit bandwidth b from the values of the current bandwidth fields of those records (indicated by symbols (13) in FIG. 8c and symbol (g) in FIG. 9).

Then, the bandwidth management server 30-11 also performs the following operations on each recovery record:

Judges whether the difference between the maximum bandwidth BWmi and the current bandwidth BWci that are stored in the maximum bandwidth field and the current bandwidth field, respectively, is greater than a predetermined threshold th (≧b) (indicated by symbol (d) in FIG. 8c).

When the judgement result is true, subtracts the threshold th from the value BWmi of the maximum bandwidth field (indicated by symbol (e) in FIG. 8c), and adds the threshold th to the value BWui of the upper limit bandwidth field that belongs to the same record as the maximum bandwidth field does (indicated by symbol (f) in FIG. 8c).

Sends a bandwidth release demand indicating that the maximum bandwidth BWmi should be updated to a latest maximum bandwidth to the routers indicated by the respective router identifiers contained in the route identifier i (indicated by symbol (m) in FIG. 9), and then sends a bandwidth release notice to the gatekeeper 80A-11 via the LAN 61-11 (indicated by symbol (g) in FIG. 8c and symbol (h) in FIG. 9).

As described above, bandwidths that should be secured for the routes of the respective routers 62-1 to 62-3 are updated as appropriate in accordance with the information amounts of speech signals to be transmitted parallel as sequences of IP datagrams via the internode links 63-12 and 63-23, and kept at proper values.

Therefore, according to this embodiment, whereas more flexible adaptation is made to the traffic distribution than in the first embodiment, the bandwidths of the internode links 63-12 and 63-23 and the processing capacities of the routers 62-1 to 62-3 are utilized properly and the transmission quality and the service quality are kept high.

In this embodiment, the values of the upper limit bandwidth fields of the bandwidth management table 42 are set in advance as constants.

However, the invention is not limited to such a configuration. The value of each upper limit bandwidth field may be updated when necessary to a value that matches the states (occurrence of a failure, a traffic distribution (including a congestion), etc.) of the routers corresponding to the respective router identifiers included in the route identifier field and the transmission section formed between those routers so that the surplus bandwidths of the respective routers are used effectively.

The operation of the third embodiment will be hereinafter described with reference to FIGS. 3–9.

This embodiment is mainly characterized by the following operations that are performed by the bandwidth management server 30-11 and the gatekeeper 80A-1 in cooperation after the bandwidth management server 30-11 sends out the above-described bandwidth confirmation notice.

When the surplus-bandwidth sufficiency judgement result contained in the bandwidth confirmation notice is true, the bandwidth management server 30-11 sends the gatekeeper 80A-11 a call persistence query (denoted by symbol (f) in FIG. 10) containing the call identifier of the call concerned at a predetermined frequency (cycle) in the period from the instant of the sending of the bandwidth confirmation notice to the gatekeeper 80A-11 to the instant of recognition of the bandwidth confirmation notice sent by the gatekeeper 80A-11 (i.e., the period when the call concerned should persist as a successful call) (indicated by symbol (A) in FIG. 8*a* and symbol (n) in FIG. 9).

When recognizing the call persistence query, the gatekeeper 80A-11 sends a message IRQ containing the call identifier that is contained in the call persistence query to the terminal processing part 71-11 corresponding to the originating party of the call concerned (indicated by symbol (A) in FIG. 7 and symbol (o) in FIG. 9).

The terminal processing part 71-11 judges (hereinafter referred to as "call persistence judgement") whether the call indicated by the call identifier that is contained in the message IRQ is persisting as a successful call (indicated by symbol (p) in FIG. 9), and sends a message IRR containing the result of the call persistence judgement to the gatekeeper 80A-11 (indicated by symbol (B) in FIG. 7 and symbol (q) in FIG. 9).

The gatekeeper 80A-11 transfers the message IRR to the bandwidth management server 30-11 as a call persistence response (denoted by symbol (g) in FIG. 10) (indicated by symbol (r) in FIG. 9).

When the result of the call persistence judgement contained in the call persistence response is true, the bandwidth management server 30-11 does not perform any special operation.

However, if the result of the call persistence judgement is false, the bandwidth management server 30-11 releases the bandwidths that have been allocated to the call (successful call) concerned (indicated by symbol (s) in FIG. 9) according to the same procedure (indicated by symbols (g) and (m) in FIG. 9) as the procedure of the operation that is performed when the bandwidth release request is recognized.

As described above, according to this embodiment, the bandwidths that have been used for the transmission of a speech signal of each successful call are released reliably at the above-mentioned frequency even when the disappearance (clearing) of the successful call is not recognized normally.

Therefore, according to this embodiment, the bandwidths that have been allocated for the transmission of a speech signal of a successful call that has disappeared are released with high reliability and the transmission bandwidths of all the internode links 63-12 and 63-23 are used effectively.

In this embodiment, the call persistence query is sent to the gatekeeper 80A-11 that is provided in the base 60-11 that accommodates the originating terminal and the message IRQ is sent to the endpoint 70-11 (terminal processing part 71-11) corresponding to the originating party.

However, the invention is not limited to such a configuration. Where the above-described call persistence judgement should be performed also in the base 60-31 that accommodates the destination party, another configuration is possible in which the gatekeeper 80A-31 sends a message IRQ to the endpoint 70-31 (terminal processing part 71-31) in response to the call persistence query as indicated by a chain line in FIG. 9 and the bandwidths that have been allocated to the call concerned are released only when either of the call persistence judgement results obtained from the originating party and the destination party is false.

In this embodiment, the gatekeeper 80A-11 sends out the message IRQ in response to the call persistence query that is sent from the bandwidth management server 30-11.

However, the invention is not limited to such a case. For example, the load of the bandwidth management server 30-11 may be reduced in such a manner that the gatekeeper 80A-11 sends out the message IRQ independently at a predetermined frequency (cycle) only in the period from the instant when it is recognized that the surplus bandwidth judgement result contained in the bandwidth management notice is true to the instant when the message DRQ is recognized.

The operation of the fourth embodiment of the invention will be hereinafter described with reference to FIGS. 3–9.

This embodiment is mainly characterized by the procedure of the following operations that are performed by the gatekeeper 80A-11 and the bandwidth management server 30-11 in cooperation.

The terminal processing part 71-11 (endpoint 70-11) corresponding to the originating party and the terminal processing part 71-31 (end point 70-31) corresponding to the destination party increase and decrease the bandwidths to be used for the transmission of a speech signal by cooperating with each other properly according to the call setup procedure.

Exemplary references for increase and decrease in the bandwidth are:

The subscriber classes or the service order of the originating party and the destination party.

The transmission system and the transmission quality that are selected or updated according to the channel control procedure.

However, the call setup, the channel control, and other processing that should be performed through cooperation among individual parts to attain the bandwidth increase and decrease are not essential features of the invention and can be realized by using various known techniques, and hence will not be described.

For example, an increase δ in a bandwidth that was secured or allocated as a bandwidth to be used for the transmission of a speech signal of a successful call is notified by the terminal processing part 71-11 (endpoint 70-11) to the gatekeeper 80A-11 as part of a bandwidth revision request that contains a call identifier indicating the call and the telephone numbers (or IP addresses) of the originating and destination terminals.

When recognizing the bandwidth revision request, the gatekeeper 80A-11 generates a bandwidth adjustment request (denoted by symbol (c) in FIG. 10) containing the bandwidth increase δ, the call identifier, and the telephone numbers (or IP addresses) of the originating and destination terminals that are contained in the bandwidth revision request, and sends the generated bandwidth adjustment request to the bandwidth management server 30-11 via the LAN 61-11 (indicated by symbol (C) in FIG. 7 and symbol (t) in FIG. 9).

When recognizing the bandwidth adjustment request, the bandwidth management server 30-11 identifies bases where the originating party and the destination party are located by analyzing the telephone numbers (or IP addresses) that are contained in the bandwidth adjustment request, and acquires an originating base identifier and a destination base identifier indicating those bases (indicated by symbol (B) in FIG. 8*a* and symbol (u) in FIG. 9).

The bandwidth management server 30-11 identifies a record corresponding to the pair of the originating base identifier and the destination base identifier among the records of the route information table 41 that were generated in advance as known information and conform to the network configuration (indicated by symbol (C) in FIG. 8*a*), and acquires the route information I that is stored in the route information field of the identified record as well as all the route identifiers i contained in the route information I (indicated by symbol (D) in FIG. 8*a*).

The bandwidth management server 30-11 performs the following operations in accordance with the value of each route identifier i:

(1) Identifies a record in which the value of the route identifier field is equal to the route identifier i among the records of the bandwidth management table 42, and acquires the upper limit bandwidth BWui, the maximum bandwidth BWmi, and the current bandwidth BWci that are stored in the upper limit bandwidth field, the maximum bandwidth field, and the current bandwidth field, respectively, of the identified record (indicated by symbol (E) in FIG. 8*b*).

(2) Judges whether the following inequality is satisfied for the above-mentioned increase δ (indicated by symbol (F) in FIG. 8*b*). When the judgement result is false, terminates the operations relating to the route identifier i.

$$BWmi-BWci \geq \delta$$

(3) Updates the current bandwidth BWci according to the following arithmetic operation (indicated by symbol (G) in FIG. 8*b*) and terminates the operations relating to the route identifier i.

$$BWci=BWci+\delta \qquad (2)$$

During the course of the operations performed for any of the values of the all route identifiers i, the bandwidth management server 30-11 performs the judgement (hereinafter referred to simply as "bandwidth judgement") as to whether the current bandwidth BWci has been updated according to the arithmetic operation (indicated by symbol (H) in FIG. 8*b*).

When the result of the bandwidth judgement is false, the bandwidth management server 30-11 invalidates the above-described operations that updated the maximum bandwidth field and the current bandwidth field of the bandwidth management table 41 and the route management table 43 (indicated by symbol (I) in FIG. 8*b*).

Then, the bandwidth management server 30-11 sends a bandwidth adjustment response (indicated by symbol (I) in FIG. 10) indicating the result of the bandwidth judgement to the gatekeeper 80A-11 via the LAN 61-11 (indicated by symbol (1) in FIG. 8*b* and symbol (v) in FIG. 9).

The gatekeeper 80A-11 terminates the operations relating to the bandwidth adjustment request when it receives the bandwidth adjustment response before a predetermined time elapses from the instant of the sending of the bandwidth adjustment request.

On the other hand, when the gatekeeper 80A-11 does not receive the bandwidth adjustment response before the predetermined time elapses, the gatekeeper 80A-11 sends a bandwidth adjustment request again to the bandwidth management server 30-11 (indicated by symbol (C) in FIG. 7).

As described above, the bandwidths to be used for the transmission of a speech signal of a telephony successful call are updated flexibly and automatically according to the call setup and channel control procedures.

Therefore, in the fourth embodiment, the network resources are utilized more effectively and a wider variety of services can be provided than in the first to third embodiments in which such bandwidth updating is not performed at all.

In each of the above embodiments, there is only one combination of internode links that can be used for the transmission of a speech signal between the originating party and the destination party.

Figure 12:
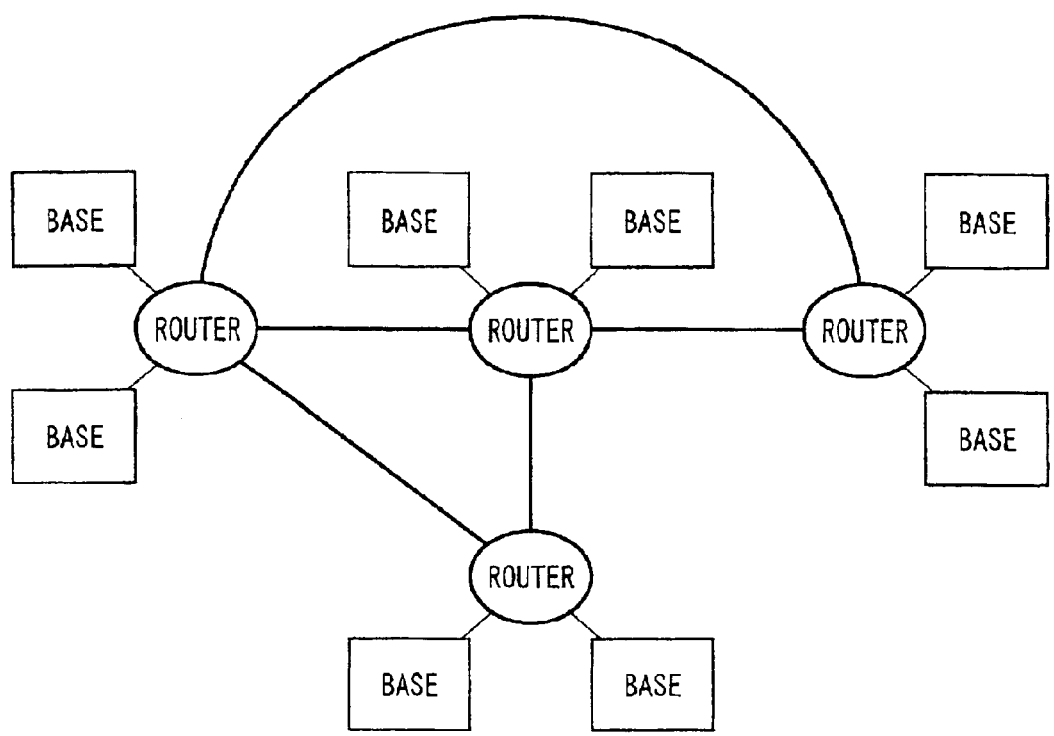
FIG. 12 shows the configuration of another network.

However, the invention is not limited to such a configuration. For example, the following configuration is possible. Where there are a plurality of combinations of internode links that can be used for the transmission of such a speech signal as shown in FIG. 12, for example, all redundant combinations of internode links are registered in the route information table 41 for each pair of an originating base identifier and a destination base identifier in the form of pieces of route information (each route information is a series of unique route identifiers indicating routes (transmission sections); each route identifier may include the identifiers of routers provided on both sides of the route) that correspond to the respective combinations of internode links. A piece of route information that does not include the router identifiers of routers that are connected to an internode link with an insufficient surplus transmission bandwidth is selected from those pieces of route information according to a predetermined algorithm. This configuration enables flexible adaptation to a redundant network configuration.

Examples of such an algorithm are as follows:

Internode links for which it has been confirmed in advance that their surplus bandwidths are sufficient, are used preferentially.

A combination of internode links with a smaller number of hops is used preferentially.

A combination of internode links with larger surplus transmission bands (smaller degrees of congestion) is used preferentially.

In each of the above embodiments, the bandwidth management server 30-11 is provided in the base 60-11 in spite of the fact that it allocates, in a unified manner, bandwidths to be used for the transmission of a speech signal of a telephony successful call that has occurred in a terminal accommodated by one of the bases 60-11, 60-12, 60-21, 60-22, 60-31, and 60-32.

However, the invention is not limited to such a configuration. The bandwidth management server 30-11 may be provided as an apparatus or node that satisfies one of the following conditions:

Combined with the gatekeepers 80A-11, 80A-12, 80A-21, 80A-22, 80A-31, and 80A-32 and the routers 62-1, 62-2, and 62-3.

Formed as a plurality of apparatuses in which one or both of function distribution and load distribution are attained and provided in all or a part of the bases 60-11, 60-12, 60-21, 60-22, 60-31, and 60-32.

Figure 13:
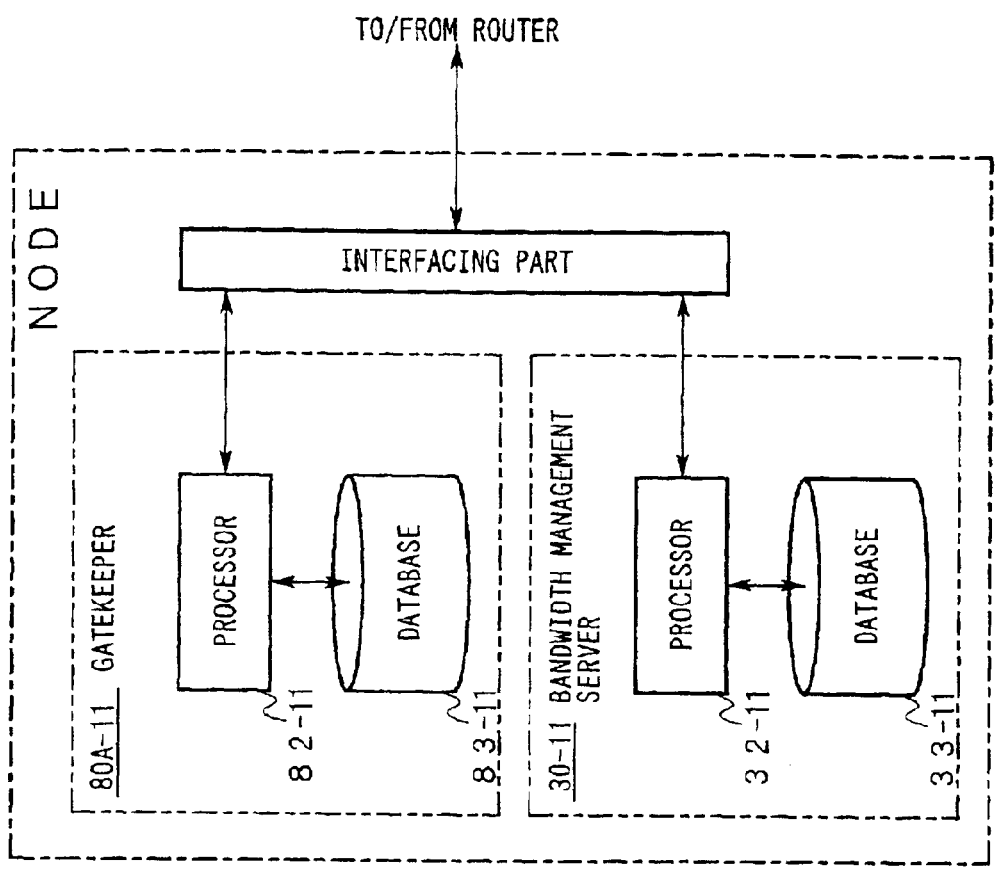
FIG. 13 shows the configuration of an exemplary node in which a gatekeeper and a bandwidth management server are combined with each other.

Provided as a single node or a node formed by combining it with the gatekeeper 80A-11 as shown in FIG. 13.

In each of the above embodiments, pairs of base identifiers and pieces of route information that conform to a network configuration are registered in the route information table in advance and are not altered.

However, the invention is not limited to such a configuration. For example, a configuration is possible in which the bandwidth management server 30-11 cooperates with the routers 62-1 to 62-3 so that the contents of the route information table 41 are kept at values that conform to routing information that is exchanged between the routers 62-1 to 62-3 according to a predetermined protocol (e.g., RIP (routing information protocol), OSPF (open shortest path first), or BGP4 (border gateway protocol version 4)). This enables flexible adaptation to a network configuration.

Further, routes to be used for the transmission of a speech signal may be selected flexibly by updating the contents of the route information table 41 when necessary in accordance with the states (the degrees of congestion, occurrence of a failure, etc.) of the internode links 63-12 and 63-23 and the routers 62-1 to 62-3.

In each of the above embodiments, a speech signal of a telephony successful call is transmitted according to the VoIP.

However, the invention is not limited to such a configuration. The invention can be applied to any networks where such a speech signal or communication information for which fluctuations in transmission delay time are not allowed as in the case of such a speech signal is transmitted as a sequence of datagrams of some form.

In each of the above embodiments, a band to be used for the transmission of a speech signal is not necessarily given as a bandwidth in a strict sense.

A band to be used for the transmission of a speech signal may be recognized as a transmission channel that is formed by an optical signal having a certain wavelength in a case where an internode link is formed as an optical transmission path according to the wavelength division multiplexing. Alternatively, where the AAL2 (ATM adaptation layer type 2) that realizes mobile trunking is applied, a band to be used for the transmission of a speech signal may be recognized as information that properly indicates a permutation or combination according to which datagrams indicating the speech signal should be packed as CPS packets.

In each of the above embodiments, the invention is applied to the Internet or an intranet (including an extranet such as a VPN) in which the TCP and the IP are used in the transport layer and the network layer, respectively.

However, the application range of the invention is not limited to such networks. The invention can similarly be applied to networks employing any communication protocol as long as a speech signal of a telephony call can be transmitted there as a sequence of datagrams or packets.

In each of the above embodiments, the gatekeeper and the endpoint pass to each other messages according to the ITU-T Recommendation H.323.

However, the invention is not limited to such a configuration. The above messages may have any names and forms as long as the bandwidth management server, the gatekeeper, and the endpoint can cooperate with each other in the same manner as in each embodiment.

In each of the above embodiments, the gatekeeper is provided in each of the bases 60-11, 60-12, 60-21, 60-22, 60-31, and 60-32.

However, the invention is not limited to such a configuration. The gatekeeper may be provided in part of the bases 60-11, 60-12, 60-21, 60-22, 60-31, and 60-32 or bases other than the 60-11, 60-12, 60-21, 60-22, 60-31, and 60-32 as long as the gatekeeper can cooperate with a desired bandwidth management server, router, or endpoint through mutual passing of the above-described messages and information.

Each of the above embodiments of the invention is characterized by the bandwidth management method. And the above-described routing of a sequence of datagrams and the above-described cooperation among the routers for the routing, the bandwidth management server, etc. can also be realized by using various known techniques. Therefore, such cooperation is not described in each of the embodiments.

However, in the invention, for example, when an optimum route is selected by the bandwidth management server, the routing may reflect the optimum route through exchange of predetermined information (routing information etc.) between the bandwidth management server and a related server.

The invention is not limited to the above-described embodiments, and various modifications and improvement in part or the whole of the constitutional apparatus can be made within the scope of the invention.

What is claimed is:

1. A bandwidth management apparatus comprising:
   a link determining section for determining a link to be used for transmitting communication information of a call when the call is assigned, the communication information being to be transmitted as a sequence of datagrams;
   a bandwidth controlling section for judging whether there exists a surplus bandwidth in all sections of the determined link and for allocating said call to a bandwidth necessary for transmitting said communication information when a judgement result is true; and
   a call controlling section for informing of said judgement result to a node relating to a call setup for said call.

2. The bandwidth management apparatus according to claim 1, wherein
   said bandwidth controlling section cooperates with all or a part of routers provided as nodes in said determined link and updates a bandwidth to be allocated to said call, the bandwidth being included in bandwidths of said determined link.

3. The bandwidth management apparatus according to claim 1, wherein
   said bandwidth controlling section judges, at a predetermined frequency, whether successful calls recognized individually persist, and releases a bandwidth used for transmitting communication information of a successful call whose judgement result is false.

4. The bandwidth management apparatus according to claim 1, wherein
   said bandwidth controlling section updates a bandwidth preferentially allocated prior to a successful call recognized, to a bandwidth adjusted according to a call setup procedure and necessary for transmitting communication information between an originating party and a destination party of the successful call.

5. The bandwidth management apparatus according to claim 1, wherein:
   said bandwidth controlling section judges whether there exists a surplus bandwidth greater than or equal to a bandwidth in said determined link, the bandwidth being adjusted according to a call setup procedure and necessary for transmitting communication information between an originating party and a destination party of a successful call recognized; and
   said call controlling section informs a node of the judgement result, the node relating to a call setup for a successful call which has been judged.

6. The bandwidth management apparatus according to claim 1, wherein
   said bandwidth controlling section judges whether there exists a bandwidth in said determined link, the bandwidth being greater than or equal to a bandwidth given according to said call setup procedure and necessary for transmitting said communication information.

7. The bandwidth management apparatus according to claim 1, wherein said link determining section:

shares routing information exchanged between routers that are provided as nodes in said determined link; and determines a link to be used for transmitting said communication information, according to said routing information.

8. The bandwidth management apparatus according to claim 1, wherein said bandwidth controlling section:

updates, in accordance with condition of said determined link, routing information set for all or a part of routers that are provided as nodes in said determined link; and secures an alternate link.

9. The bandwidth management apparatus according to claim 1, wherein said bandwidth controlling section estimates said surplus bandwidth of said determined link as a multiple of a bandwidth necessary for transmitting communication information of a single successful call.

10. An address resolution assistance apparatus comprising:

a storage section wherein a pair of a telephone number and an address is stored, the telephone number and address being allocated to a terminal capable of becoming an originating party of a call whose communication information is to be transmitted as a sequence of datagrams; and an address resolution assistance section for referring to said storage section in a process of call setup for a call of said terminal and for interconverting a telephone number and an address that are allocated to one or both of an originating party and a destination party of the call, wherein said address resolution assistance section:

obtains one of information representing a link to be used for transmitting communication information of said call and information necessary for determining the link, by cooperating with said originating party; and informs of the obtained information to a bandwidth management apparatus for managing bandwidth of said link.

11. The address resolution assistance apparatus according to claim 10, wherein said address resolution assistance section:

inquires one or both of an originating party and a destination party of a successful call assigned about whether the successful call persists, in response to an external request for the successful call; and informs said bandwidth management apparatus of a result of the inquiry.

12. The address resolution assistance apparatus according to claim 10, wherein said address resolution assistance section:

inquires one or both of an originating party and a destination party of a successful call assigned about whether the successful call persists; and informs said bandwidth management apparatus of a result of the inquiry.

13. The address resolution assistance apparatus according to claim 10, wherein said address resolution assistance section acquires a bandwidth and informs said bandwidth management apparatus of the acquired bandwidth, the bandwidth being determined based on a call setup procedure and being used for transmitting communication information between an originating party and a destination party of a successful call assigned.

14. The address resolution assistance apparatus according to claim 13, wherein said address resolution assistance section estimates a bandwidth to be used for transmitting communication information, as the number of successful calls.

15. The address resolution assistance apparatus according to claim 10, wherein said address resolution assistance section:

is given a bandwidth to be used for transmitting communication information of a call, as a part of information necessary for determining a link in said process of call setup for the call; and informs said bandwidth management apparatus of the given bandwidth.

16. A method for managing a bandwidth, comprising the steps of:

determining a link to be used for transmitting communication information of a call when the call is assigned, the communication information being to be transmitted as a sequence of datagrams;

judging whether there exists a surplus bandwidth in all sections of the determined link and for allocating said call to a bandwidth necessary for transmitting said communication information when a judgement result is true; and informing of said judgement result to a node relating to a call setup for said call.

17. The method for managing a bandwidth according to claim 16, comprising the step of judging whether there exists a bandwidth in said determined link, the bandwidth being greater than or equal to a bandwidth given based on a call setup procedure and necessary for the transmitting said communication information.

18. A method for assisting address resolution, comprising the steps of:

interconverting a telephone number and an address allocated to one or both of an originating party and a destination party of a call whose communication information is to be transmitted as a sequence of datagrams, in a process of call setup for the call of a terminal;

obtaining one of a specific piece of information representing a link to be used for transmitting communication information of said call and a specific piece of information necessary for determining the link, by cooperating with said originating party in said process of call setup; and informing of the obtained specific information to a bandwidth management apparatus for managing a bandwidth of said link.

* * * * *